(12) United States Patent
Hampali et al.

(10) Patent No.: US 11,804,040 B2
(45) Date of Patent: Oct. 31, 2023

(54) KEYPOINT-BASED SAMPLING FOR POSE ESTIMATION

(71) Applicant: QUALCOMM Technologies, Inc., San Diego, CA (US)

(72) Inventors: Shreyas Hampali, Graz (AT); Vincent Lepetit, Talence (FR); Clemens Arth, Gratwein-Strassengel (AT)

(73) Assignee: QUALCOMM Incorporated, San Diego, CA (US)

( * ) Notice: Subject to any disclaimer, the term of this patent is extended or adjusted under 35 U.S.C. 154(b) by 14 days.

(21) Appl. No.: 17/457,408

(22) Filed: Dec. 2, 2021

(65) Prior Publication Data
US 2022/0301304 A1    Sep. 22, 2022

Related U.S. Application Data

(60) Provisional application No. 63/162,305, filed on Mar. 17, 2021.

(51) Int. Cl.
*G06V 20/20* (2022.01)
*G06T 7/73* (2017.01)
(Continued)

(52) U.S. Cl.
CPC ............ *G06V 20/20* (2022.01); *G06F 18/213* (2023.01); *G06F 18/2431* (2023.01); *G06N 3/04* (2013.01);
(Continued)

(58) Field of Classification Search
CPC ............ G06N 3/049; G06N 3/02; G06N 3/08; G06N 20/00; G06N 3/088; G06N 5/022; G06F 2111/18; G06F 3/0481; G06F 3/04817; G06F 9/4443; G06F 3/04847; G06F 11/3664; G06F 3/012;
(Continued)

(56) References Cited

U.S. PATENT DOCUMENTS 9,383,895 B1\* 7/2016 Vinayak .............. G06F 3/04883
2017/0109936 A1\* 4/2017 Powderly .............. G06F 3/0482
(Continued)

FOREIGN PATENT DOCUMENTS

EP    3467707 A1    4/2019

OTHER PUBLICATIONS

Fan L., et al., "3D Hand Pose Estimation Based on Five-Layer Ensemble CNN", Sensors, vol. 21, No. 2, Jan. 19, 2021, XP055842008, pp. 1-16, p. 649, pp. 1-6, figures 1-3.
(Continued)

*Primary Examiner* — Todd Buttram
(74) *Attorney, Agent, or Firm* — Polsinelli/Qualcomm

(57) ABSTRACT

Systems and techniques are provided for determining one or more poses of one or more objects. For example, a process can include determining, using a machine learning system, a plurality of keypoints from an image. The plurality of keypoints are associated with at least one object in the image. The process can include determining a plurality of features from the machine learning system based on the plurality of keypoints. The process can include classifying the plurality of features into a plurality of joint types. The process can include determining pose parameters for the at least one object based on the plurality of joint types.

28 Claims, 14 Drawing Sheets

(51) Int. Cl.
    *G06V 40/10*     (2022.01)
    *G06T 9/00*     (2006.01)
    *G06T 7/80*     (2017.01)
    *G06T 7/50*     (2017.01)
    *G06T 19/00*     (2011.01)
    *G06V 10/40*     (2022.01)
    *G06V 10/82*     (2022.01)
    *G06K 9/62*     (2022.01)
    *G06N 3/04*     (2023.01)
    *G06F 18/213*     (2023.01)
    *G06F 18/2431*     (2023.01)

(52) U.S. Cl.
CPC .............. *G06T 7/50* (2017.01); *G06T 7/73* (2017.01); *G06T 7/80* (2017.01); *G06T 9/002* (2013.01); *G06T 19/006* (2013.01); *G06V 10/40* (2022.01); *G06V 10/82* (2022.01); *G06V 40/11* (2022.01); *G06T 2200/08* (2013.01); *G06T 2207/20081* (2013.01); *G06T 2207/20084* (2013.01); *G06T 2207/30196* (2013.01); *G06T 2207/30244* (2013.01)

(58) Field of Classification Search
CPC .......... G06F 3/0304; G06F 3/011–015; G06V 20/20; G06T 19/00; G06T 17/00; G06T 7/00; G06T 19/006; G06T 2215/16; H04N 5/272; H04N 2201/3245; A63F 13/10; G02B 27/01
See application file for complete search history.

(56) References Cited

U.S. PATENT DOCUMENTS

2018/0293738 A1* 10/2018 Yang ..................... G06F 18/211
2019/0172224 A1*  6/2019 Vajda ..................... G06N 3/045
2021/0374989 A1* 12/2021 Weinzaepfel ........ G06V 40/103
2022/0301304 A1*  9/2022 Hampali ................ G06V 20/20

OTHER PUBLICATIONS

Hampali S., et al., "HOnnotate: A Method for 3D Annotation of Hand and Object Poses", 2020 IEEE/CVF Conference on Computer Vision and Pattern Recognition, IEEE, Jun. 13, 2020, XP033805584, pp. 3193-3203, p. 3193-p. 3200, figures 1,2.
International Search Report and Written Opinion—PCT/US2022/013754—ISA/EPO—dated Apr. 28, 2022.
Sun Z., et al., "Two-Hand Pose Estimation from the Non-Cropped RGB Image with Self-Attention Based Network", 2021 IEEE International Symposium on Mixed and Augmented Reality, IEEE, Oct. 4, 2021, XP034023847, pp. 248-255, p. 248-p. 254, figures 1-8.

* cited by examiner

KEYPOINT-BASED SAMPLING FOR POSE ESTIMATION

CROSS-REFERENCE TO RELATED APPLICATIONS

The present application claims the benefit of U.S. Provisional Application No. 63/162,305, filed Mar. 17, 2021, entitled "KEYPOINT-BASED SAMPLING FOR POSE ESTIMATION," which is hereby incorporated by reference in its entirety and for all purposes.

FIELD

The present disclosure generally relates to determining or estimating poses of objects in images or frames. For example, aspects of the present disclosure relate to performing keypoint-based sampling for determining or estimating the poses of objects (e.g., hands, a hand and a physical object, etc.) in images or frames.

BACKGROUND

Determining objects that are present in images and attributes of those objects is useful for many applications. For instance, a system can determine a pose of an object (e.g., a person, a portion of the person such as a hand or face, a vehicle, a building, etc.) in an image. In some cases, the system can use the pose to determine or generate a model (e.g., a three-dimensional (3D) model) for representing the object. For instance, the model can be generated with the pose determined for the object.

A pose determined for an object in an image (and in some cases a model generated as having the pose) can be used to facilitate effective operation of various systems and/or applications. Examples of such applications and systems include extended reality (XR) systems (e.g., augmented reality (AR) systems, virtual reality (VR) systems, and/or mixed reality (MR) systems), robotics, automotive and aviation, 3D scene understanding, object grasping, object tracking, in addition to many other applications and systems. In various illustrative examples, a 3D model having a determined pose can be displayed (e.g., by a mobile device, by an XR system, and/or by other systems or devices), used to determine locations of an object represented by the 3D model (e.g., for scene understanding and/or navigation, for object grasping, for autonomous vehicle operation, and/or for other uses), among other uses.

Determining accurate poses of objects can allow a system to generate accurately positioned and oriented representations (e.g., models) of the objects.

SUMMARY

In some examples, systems and techniques are described for performing keypoint-based sampling for determining or estimating the poses of objects in images. For instance, the systems and techniques can be used to determine poses of two hands of a person in an image, a pose of a hand and a pose of a physical object positioned relative to the hand (e.g., a cup or other object held by or in proximity to the hand), poses of two hands of a person and a pose of a physical object positioned relative to one or both of the hands, and/or other objects.

According to at least one example, a method of determining one or more poses of one or more objects is provided. The method includes: determining, using a machine learning system, a plurality of keypoints from an image, the plurality of keypoints being associated with at least one object in the image; determining a plurality of features from the machine learning system based on the plurality of keypoints; classifying the plurality of features into a plurality of joint types; and determining pose parameters for the at least one object based on the plurality of joint types.

In another example, an apparatus for determining one or more poses of one or more objects is provided. The apparatus includes at least one memory and at least one processor (e.g., implemented in circuitry) coupled to the memory. The at least one processor is configured to and can: determine, using a machine learning system, a plurality of keypoints from an image, the plurality of keypoints being associated with at least one object in the image; determine a plurality of features from the machine learning system based on the plurality of keypoints; classify the plurality of features into a plurality of joint types; and determine pose parameters for the at least one object based on the plurality of joint types.

In another example, a non-transitory computer readable medium is provided that has stored thereon instructions that, when executed by one or more processors, cause the one or more processors to: determine, using a machine learning system, a plurality of keypoints from an image, the plurality of keypoints being associated with at least one object in the image; determine a plurality of features from the machine learning system based on the plurality of keypoints; classify the plurality of features into a plurality of joint types; and determine pose parameters for the at least one object based on the plurality of joint types.

In another example, an apparatus for determining one or more poses of one or more objects is provided. The apparatus includes: means for determining, using a machine learning system, a plurality of keypoints from an image, the plurality of keypoints being associated with at least one object in the image; means for determining a plurality of features from the machine learning system based on the plurality of keypoints; means for classifying the plurality of features into a plurality of joint types; and means for determining pose parameters for the at least one object based on the plurality of joint types.

In some aspects, the at least one object includes two objects. In such aspects, the plurality of keypoints includes keypoints for the two objects. In such aspects, the pose parameters can include pose parameters for the two objects.

In some aspects, the at least one object includes at least one hand. In some cases, the at least one hand includes two hands. In such cases, the plurality of keypoints can include keypoints for the two hands. In such cases, the pose parameters can include pose parameters for the two hands.

In some aspects, the at least one object includes a single hand. In such aspects, the methods, apparatuses, and computer readable medium described above can further include: determining, using the machine learning system, a plurality of object keypoints from the image, the plurality of object keypoints being associated with an object associated with the single hand; and determining pose parameters for the object based on the plurality of object keypoints.

In some aspects, each keypoint of the plurality of keypoints corresponds to a joint of the at least one object.

In some aspects, to determine the plurality of features from the machine learning system based on the plurality of keypoints, the methods, apparatuses, and computer readable medium described above can further include: determining, from a first feature map of the machine learning system, a first set of features that correspond to the plurality of keypoints, the first feature map including a first resolution; and determining, from a second feature map of the machine learning system, a second set of features that correspond to the plurality of keypoints, the second feature map including a second resolution.

In some aspects, the methods, apparatuses, and computer readable medium described above can further include: generating a feature representation for each keypoint of the plurality of keypoints, wherein the plurality of features are classified into the plurality of joint types using the feature representation for each keypoint. In some cases, the feature representation for each keypoint includes an encoding vector.

In some aspects, the machine learning system includes a neural network, the neural network using the image as input.

In some aspects, the plurality of features are classified into the plurality of joint types by an encoder of a transformer neural network, and the pose parameters determined for the at least one object are determined based on the plurality of joint types by a decoder of the transformer neural network.

In some aspects, the pose parameters are determined for the at least one object based on the plurality of joint types and based on one or more learned joint queries. In some cases, the at least one object includes a first object and a second object. In such cases, the one or more learned joint queries can be used to predict at least one of a relative translation between the first object and the second object, a set of object shape parameters, and camera model parameters.

In some aspects, the pose parameters for the at least one object include a three-dimensional vector for each joint of the plurality of joint types. In some cases, the three-dimensional vector for each joint of the plurality of joint types includes a horizontal component, a vertical component, and a depth component. In some cases, the three-dimensional vector for each joint of the plurality of joint types includes a vector between each joint and a parent joint associated with each joint.

In some aspects, the pose parameters for the at least one object include a location of each joint and a difference between a depth of each joint and a depth of a parent joint associated with each joint.

In some aspects, the pose parameters for the at least one object include a translation of the at least one object relative to another object in the image.

In some aspects, the pose parameters for the at least one object include a shape of the at least one hand.

In some aspects, the methods, apparatuses, and computer readable medium described above can further include determining a user input based on the pose parameters.

In some aspects, the methods, apparatuses, and computer readable medium described above can further include rendering virtual content based on the pose parameters.

In some aspects, the apparatus can include or be part of a mobile device (e.g., a mobile telephone or so-called "smart phone"), a wearable device, an extended reality device (e.g., a virtual reality (VR) device, an augmented reality (AR) device, or a mixed reality (MR) device such as a head-mounted display (HMD), XR glasses, or the like), a personal computer, a laptop computer, a vehicle (or computing device or component of a vehicle), a server computer, a television, a video game console, or other device. In some aspects, the apparatus further includes at least one camera for capturing one or more images or video frames. For example, the apparatus can include a camera (e.g., an RGB camera) or multiple cameras for capturing one or more images and/or one or more videos including video frames. In some aspects, the apparatus includes a display for displaying one or more images, one or more 3D models, one or more videos, one or more notifications, any combination thereof, and/or other displayable data. In some aspects, the apparatus includes a transmitter configured to transmit data (e.g., data representing images, video, 3D models, etc.) over a transmission medium to at least one device. In some aspects, the processor includes a neural processing unit (NPU), a central processing unit (CPU), a graphics processing unit (GPU), or other processing device or component.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the below figures.

DETAILED DESCRIPTION

Figure 1A:
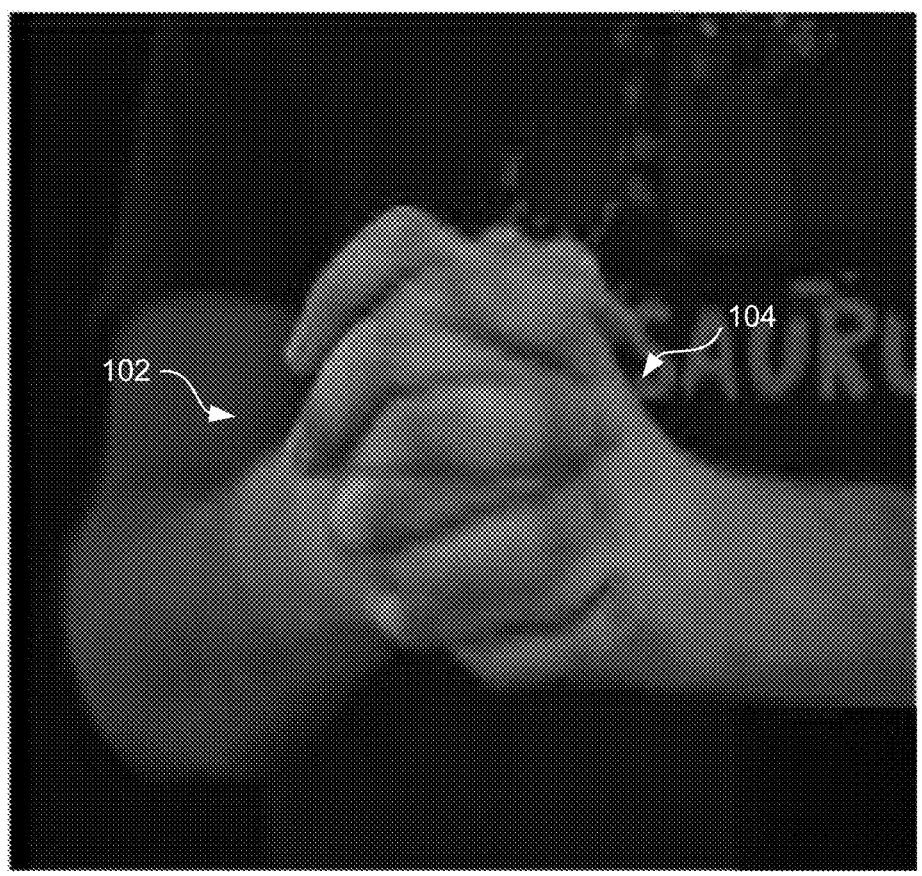
FIG. 1A-FIG. 1D are images illustrating examples of interactions of hands in an image, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing the example embodiments. It should be understood that various changes may be made in the function and arrangement of elements without departing from the spirit and scope of the application as set forth in the appended claims.

As noted above, a system can determine a pose of an object in an image or frame. The terms image and frame are used herein interchangeably. For example, an image or frame can refer to a stand-alone image (e.g., a still image), can refer to an image or frame from a sequence of frames (e.g., from a video), can refer to a depth image including depth information, and/or other type of image or frame. The pose can include position (e.g., translation in three dimensions) and orientation (e.g., pitch, roll, and yaw). In some cases, the system can use the pose to generate a model (e.g., a three-dimensional model) for representing the object. A pose determined for an object in an image (and in some cases a model generated with the determined pose) can be used to facilitate effective operation of various systems and/or applications. Examples of systems and application that can utilize pose information include extended reality (XR) systems (e.g., augmented reality (AR) systems, virtual reality (VR) systems, and/or mixed reality (MR) systems), robotics, automotive and aviation, 3D scene understanding, object grasping, object tracking, and/or other systems and applications.

In one example, based on determining a pose of an object in an image, a system can generate a three-dimensional (3D) model of the object with the determined pose. The 3D model can be displayed (e.g., by a mobile device, by an XR system, and/or by other systems or devices), used to determine locations of an object represented by the 3D model (e.g., for scene understanding and/or navigation, for object grasping, for autonomous vehicle operation, and/or for other uses), among other uses.

In some AR systems, for example, a user may view images that include an integration of artificial or virtual graphics with the user's natural surroundings. In some cases, the user can view the real world through a display of the AR system (e.g., lenses of AR glasses), with virtual objects or graphics also being displayed. In some cases, the user views images of the real-world environment, along with virtual objects or graphics. Such AR applications allow real images to be processed to add virtual objects to the images and to align the virtual objects to the image in multiple dimensions. For instance, a real-world object that exists in reality can be represented using a model that resembles or is an exact match of the real-world object. In one example, a model of a virtual airplane representing a real airplane sitting on a runway may be presented in the view of an AR device (e.g., glasses, goggles, or other device) while the user continues to view his or her natural surroundings in the AR environment. The viewer may be able to manipulate the model while viewing the real-world scene. In another example, an actual object sitting on a table may be identified and rendered with a model that has a different color or different physical attributes in the AR environment. In some cases, artificial virtual objects that do not exist in reality or computer-generated copies of actual objects or structures of the user's natural surroundings can also be added to the AR environment.

Determining accurate poses of objects in images can aid in generating accurately positioned and oriented representations (e.g., 3D models) of the objects. For instance, 3D hand pose estimation has the potential to enhance various systems and applications (e.g., XR systems such as VR, AR, MR, etc., interactions with computers and robots, among others), such as by making them more efficient and/or intuitive. In one case using an AR system as an illustrative example, improving 3D hand pose estimation can allow the AR system to interpret gesture-based inputs from a user more accurately. In another example, improved 3D hand estimation can greatly increase the accuracy of remote controlled operations (e.g., remote operation of an autonomous vehicle, remote surgery using a robotics system, etc.) by allowing a system to accurately determine the correct position and orientation of the hands in one or more images (e.g., a video of images or frames).

Figure 1B:
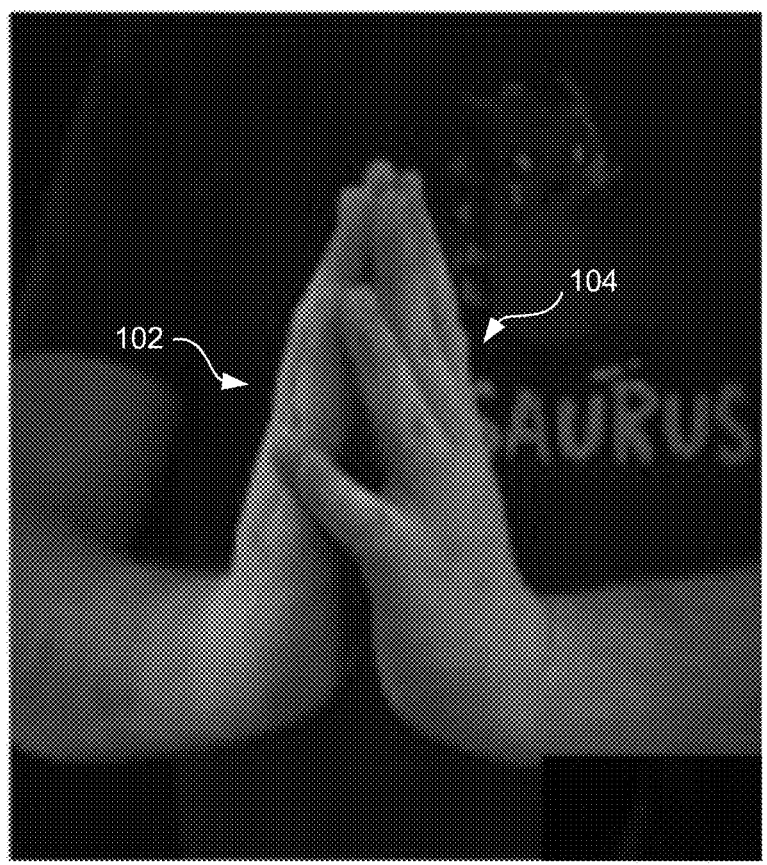
Figure 1C:
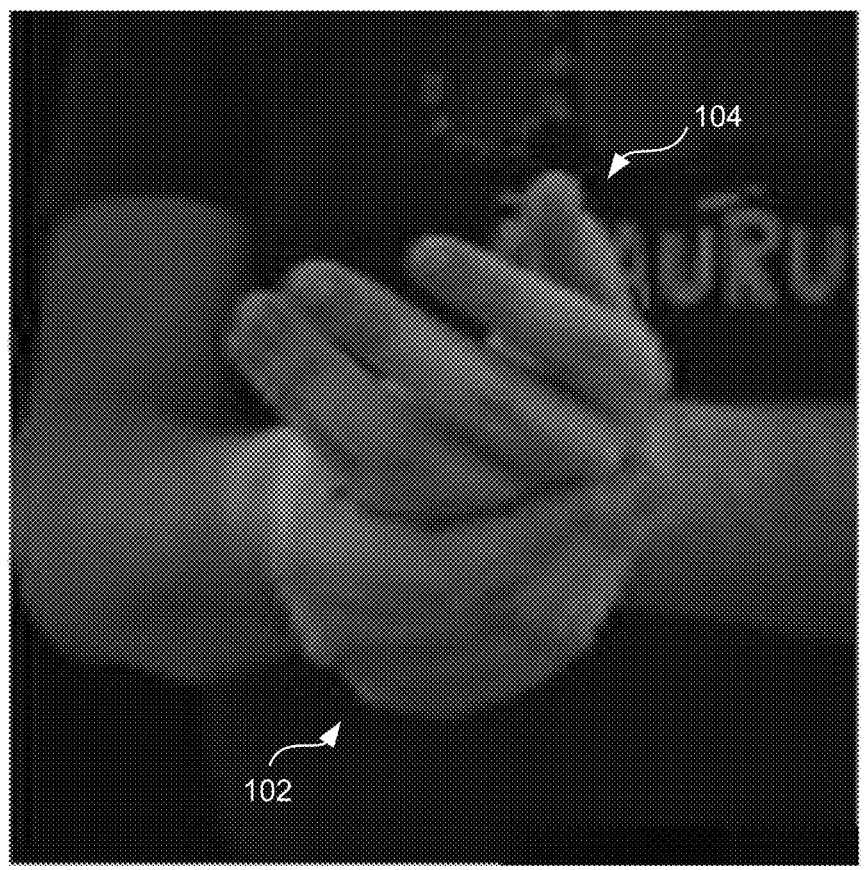
Figure 1D:

Accurately determining poses of certain objects can be difficult in some cases. For instance, it can be difficult to determine or estimate poses of objects that are interacting with one another in an image. In one illustrative example, one hand of a user may be in close interaction with another hand of the user in an image. FIG. 1A-FIG. 1D are images illustrating examples of close interactions of hands. For instance, as shown in FIG. 1A, a user's right hand 102 is clasped together with the left hand 104 in an overlapping fashion, resulting in occlusions and ambiguities as to which fingers and joints below to which hand. As shown in FIG. 1B, the user's right hand 102 and left hand 104 are joined together, with the fingertips of the right hand 102 touching the fingertips of the left hand 104. As shown in FIG. 1C, the user's right hand 102 is grasping the left hand 104. In FIG. 1D, the right hand 102 and left hand 104 are jointed together, with the fingers of both hands 102, 104 alternating in a vertical direction (relative to the image plane).

As noted above, determining the poses of objects in an image that are interacting with one another (e.g., the hands shown in FIG. 1B-FIG. 1D) can be a challenging problem. Using hands as an illustrative example, the joints of the hands can be identified from the image and used to determine the poses of the hands. However, there can be occlusions between joints of the hands and uncertainty as to which joints that are visible in the image belong to which hand. Referring to FIG. 1A-FIG. 1D as illustrative examples, a system may not be able to readily determine which joints belong to the right hand 102 and which joints belong to the left hand 104. Further, some of the joints may not be visible due to occlusions (e.g., the thumb joints in the image of in FIG. 1A, some of the joints of the left hand 104 in FIG. 1D, etc.). Similar issues can arise when processing images having other objects that are interacting, resulting in occlusions and/or other ambiguity. For example, an image may contain one or more hands of a user holding a coffee cup. However, portions of one or both hands and/or portions of the coffee cup may be occluded due to the interaction of the hand(s) with one another and with the coffee cup.

Significant progress has been made in single-hand pose estimation from depth maps and single color images (e.g., images having a red (R) component, a blue (B) component, and a green (G) component per pixel, referred to as RGB images, YUV or YCbCr images including a luma or luminance component Y and chroma or chrominance components U and V or Cb and Cr per pixel, or other types of images). Being able to determine poses of objects in RGB images can be attractive, as it does not require an active sensor (e.g., a depth sensor) that consumes a large amount of power (e.g., based on the sensor being continuously active).

Many approaches have been proposed for performing hand-pose estimation, such as using direct prediction of the 3D joint locations or angles using different convolutional network architectures, and relying on rendering for fine pose estimation and tracking.

In contrast to single-hand pose estimation, less progress has been made with respect to two-hand pose estimation. The two-hand pose estimation problem can be more difficult as compared to single-hand pose estimation. For instance, the appearance similarities between the joints of two hands in an image can make it difficult to accurately identify the hand joints (e.g., as illustrated in FIG. 1A-FIG. 1D). Moreover, some of the joints of a hand are likely to be occluded by the other hand or the same hand (e.g., as illustrated in FIG. 1A-FIG. 1D). Existing solutions are deficient in correctly estimating the hand poses in such cases. For example, first detecting the left and right hands before independently predicting their 3D poses performs poorly in scenarios where the hands are in close interaction with one another, such as shown in FIG. 1A-FIG. 1D. In another example, bottom-up approaches that first estimate the 2D joint locations and their depths can struggle to deal with the joint similarities and occlusions when trying to identify the joints in the images.

Systems, methods (also referred to as processes), apparatuses, and computer-readable media (collectively referred to as "systems and techniques") are described herein for performing keypoint-based sampling for determining or estimating the poses of objects (e.g., hands, a hand and a physical object, etc.) in images. The systems and techniques described herein can be used to determine poses of any type of object or combination of objects (e.g., a same type of object, different types of objects, etc.) in one or more images. For instance, the systems and techniques can be used to estimate or determine poses of two hands of a person in an image, a pose of a hand and a pose of a physical object positioned relative to the hand (e.g., a cup or other object held by or in proximity to, such as occluded by, the hand), poses of two hands of a person and a pose of a physical object positioned relative to one or both of the hands, and/or poses of other types of objects in images. While examples are described herein using hands and objects interacting or in proximity to hands as illustrative examples of objects, it will be understood that the systems and techniques can be used to determine poses of any type of object.

Figure 2A:
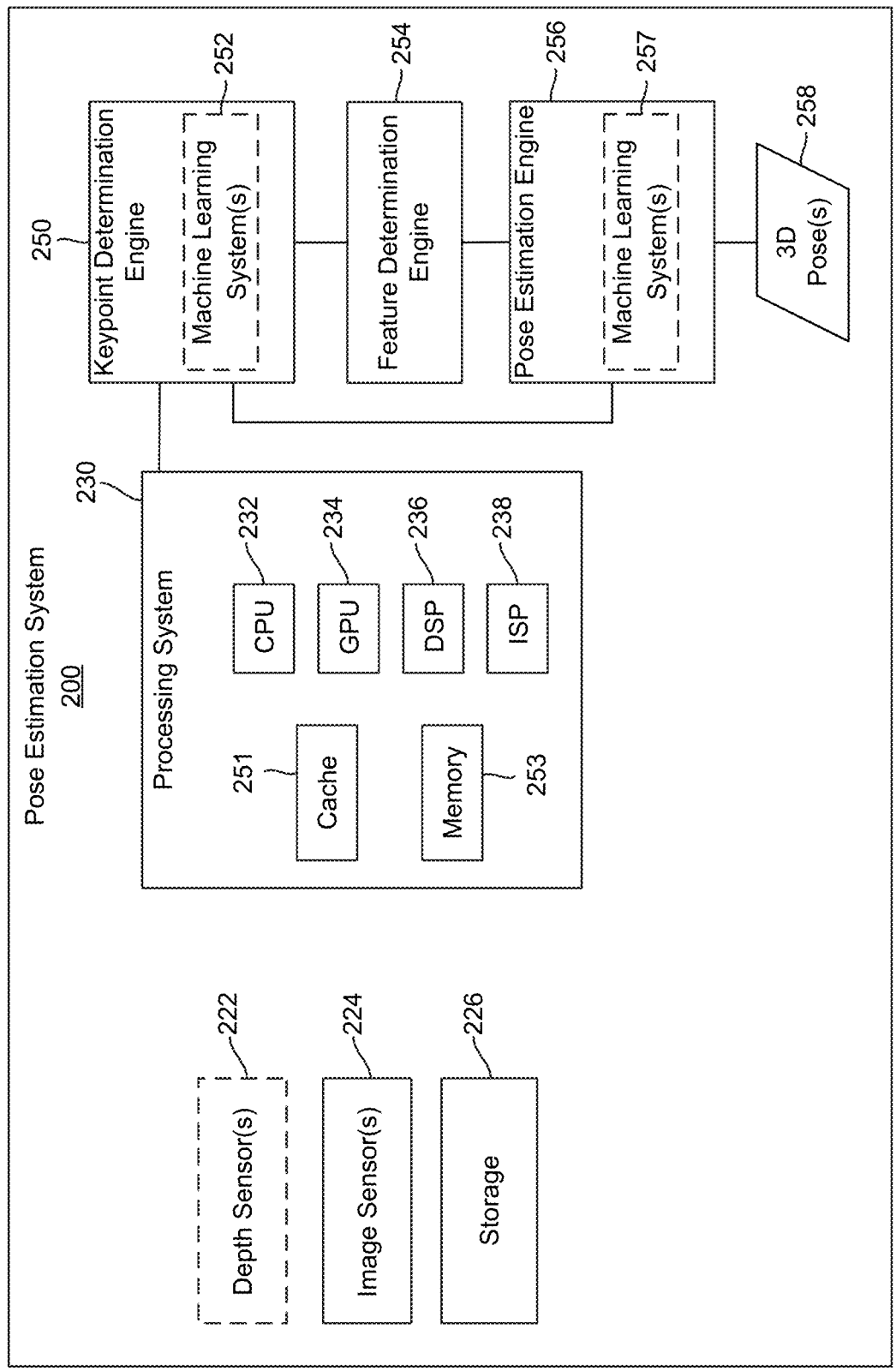
FIG. 2A is a diagram illustrating an example of a pose estimation system, in accordance with some examples.

FIG. 2A is a diagram illustrating an example of a pose estimation system 200 configured to perform keypoint-based sampling for determining or estimating poses of objects in images. The pose estimation system 200 includes one or more an image sensors 224, a storage 226, one or more depth sensors 222 (which are optional as indicated by the dotted outline shown in FIG. 2A), a processing system 230, a keypoint determination engine 250, a feature determination engine 254, and a pose estimation engine 256. In some examples, the keypoint determination engine 250 includes a machine learning system 252, which can include one or more neural networks and/or other machine learning systems. In one illustrative example, the machine learning system 252 of the keypoint determination engine 250 can include a U-net neural network. In some examples, the pose estimation engine 256 includes a machine learning system 257, which can include one or more neural networks and/or other machine learning systems. In one illustrative example, the machine learning system 257 of the pose estimation engine 256 can include a transformer neural network (e.g., including a transformer encoder and a transformer decoder).

Figure 8:
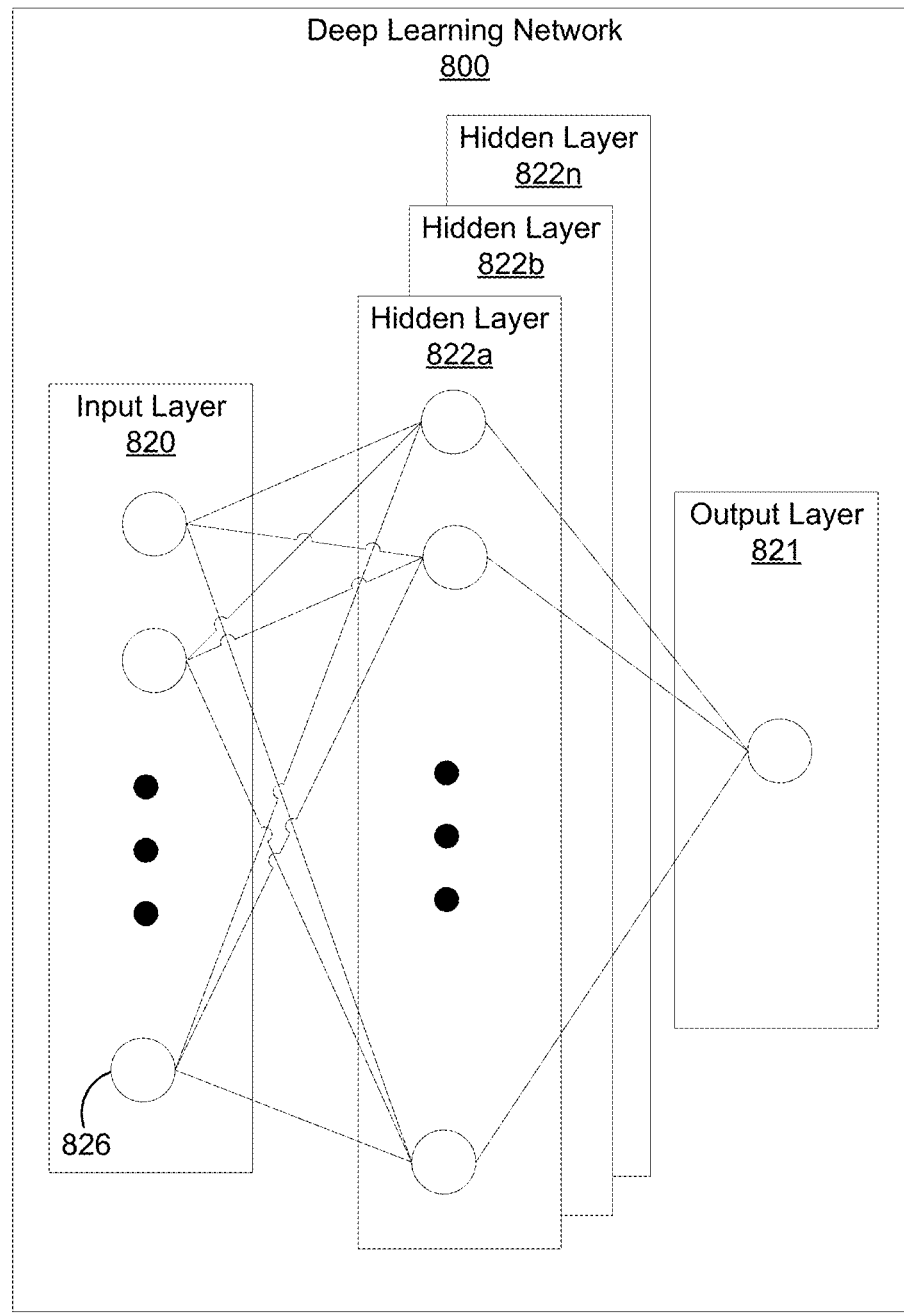
FIG. 8 is a block diagram illustrating an example of a deep learning neural network, in accordance with some examples.

Illustrative examples of neural networks are described below with respect to FIG. 8 and FIG. 9.

The processing system 230 can include components including, for example and without limitation, a central processing unit (CPU) 232, a graphics processing unit (GPU) 234, a digital signal processor (DSP) 236, an image signal processor (ISP) 238, a cache memory 251, and/or a memory 253, which the processing system 230 can use to perform one or more of the operations described herein. For example, the CPU 232, the GPU 234, the DSP 236, and/or the ISP 238 can include electronic circuits or other electronic hardware, such as one or more programmable electronic circuits. The CPU 232, the GPU 234, the DSP 236, and/or the ISP 238 can implement or execute computer software, firmware, or any combination thereof, to perform the various operations described herein. The software and/or firmware can include one or more instructions stored on a computer-readable storage medium and executable by one or more processors of the processing system 230. In some cases, one or more of the CPU 232, the GPU 234, the DSP 236, and/or the ISP 238 can implement the keypoint determination engine 250, the feature determination engine 254, and/or the pose estimation engine 256. It should be noted that, in some examples, the processing system 230 can implement one or more computing engines that are not shown in FIG. 2A. The keypoint determination engine 250, the feature determination engine 254, and the pose estimation engine 256 are provided herein for illustration and explanation purposes, and other possible computing engines are not shown for the sake of simplicity.

The pose estimation system 200 can be part of, or implemented by, a computing device or multiple computing devices. In some examples, the pose estimation system 200 can be part of an electronic device (or devices) such as an extended reality (XR) device (e.g., a head-mounted display (HMD), XR glasses, etc. for rendering virtual reality (VR), augmented reality (AR), and/or mixed reality (MR), AR glasses, or other extended reality device), a heads-up display (HUD), a mobile device (e.g., a smartphone, a cellular telephone, or other mobile device), a vehicle or a computing component or system in a vehicle (e.g., an autonomous vehicle or a human-driven vehicle), a camera system or device (e.g., a digital camera, a camera phone, a video phone, an IP camera, a video camera, a security camera, or other camera system or device), a laptop or notebook computer, a tablet computer, a set-top box, a television, a display device, a digital media player, a gaming console, a video streaming device, a drone, an Internet-of-Things (IoT) device, a smart wearable device, or any other suitable electronic device(s).

In some implementations, the one or more depth sensors 222, the image sensor 224, the storage 226, the processing system 230, the keypoint determination engine 250, the feature determination engine 254, and the pose estimation engine 256 can be part of the same computing device. For example, in some cases, the one or more depth sensors 222, the image sensor 224, the storage 226, the processing system 230, the keypoint determination engine 250, the feature determination engine 254, and the pose estimation engine 256 can be integrated into an XR device, computing system of a vehicle, smartphone, camera, laptop, tablet computer, smart wearable device, HMD, IoT device, gaming system, and/or any other computing device. However, in some implementations, one or more of the depth sensor 222, the image sensor 224, the storage 226, the processing system 230, the keypoint determination engine 250, the feature determination engine 254, and/or the pose estimation engine 256 can be part of, or implemented by, two or more separate computing devices.

Figure 2B:
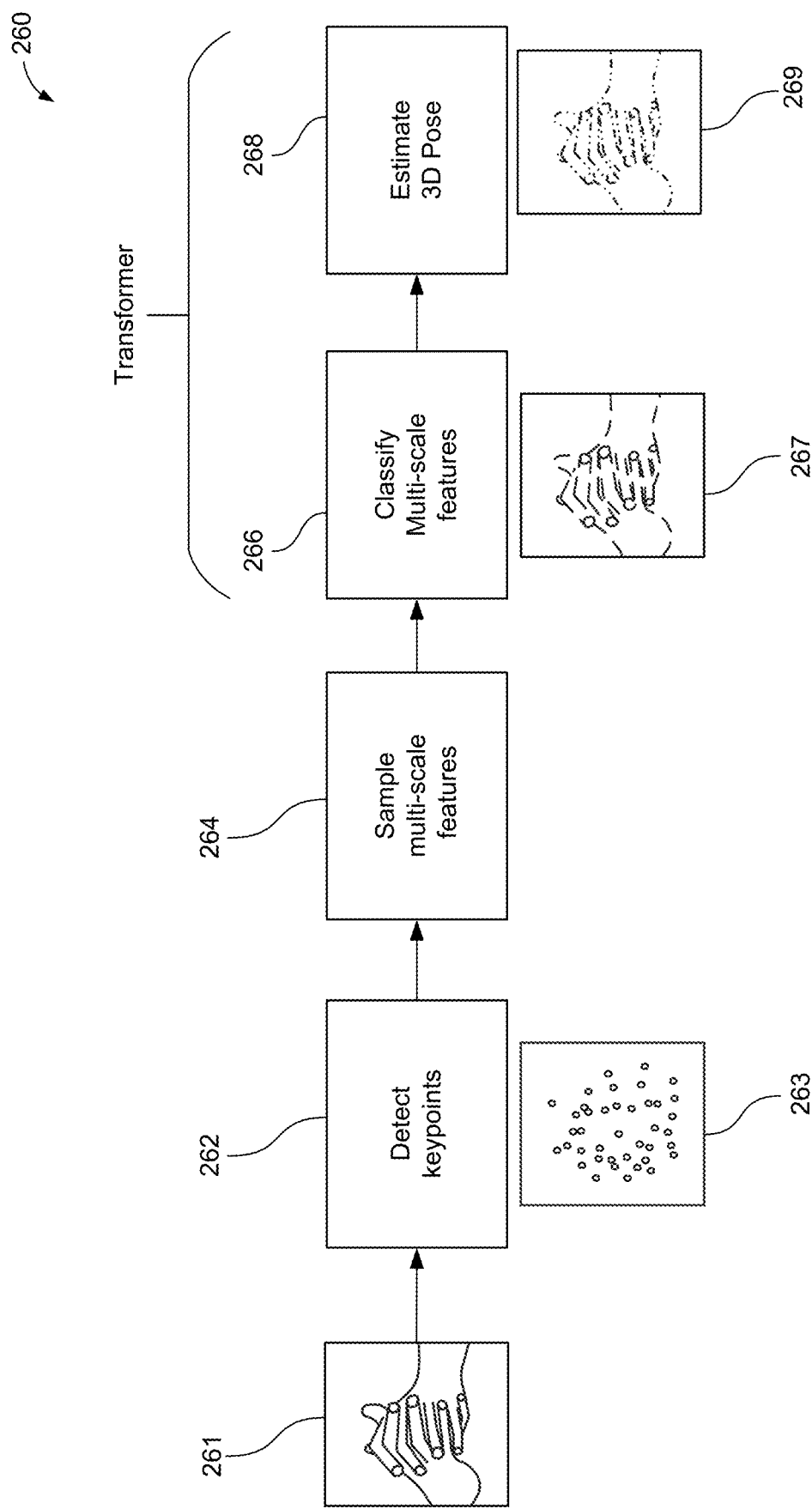
FIG. 2B is a diagram illustrating an example of a process for determining poses one or more objects from an input image, in accordance with some examples.

FIG. 2B is a diagram showing an illustrative example of a process 260 that can be performed by the pose estimation system 200 for determining poses one or more objects from an input image. The pose estimation system 200 can obtain input images from an image source (not shown), such as the input image 261 shown in FIG. 2B. The image source can include one or more image sensors (e.g., a camera) included in or in communication with the pose estimation system 200, an image and/or video storage device (e.g., the storage 226 or other storage device of the system 200 or of another system or device), an image and/or video archive containing stored images, an image and/or video server or content provider providing image and/or video data, an image and/or video feed interface receiving images from a video server or content provider, a computer graphics system for generating computer graphics image and/or video data, a combination of such sources, or other source of image frame content. In some cases, multiple image sources (e.g., multiple image sensors, multiple storage devices, etc.) can provide images to the pose estimation system 200. The images can be red-green-blue (RGB) images having red, green, and blue color components per pixel, a luma, chroma-red, chroma-blue (YCbCr) image having a luma component and two chroma (color) components (chroma-red and chroma-blue) per pixel, or any other suitable type of color or monochrome image. In some cases, the images can include depth information, such as a RGB-depth (RGB-D) image containing RGB color components and depth information per pixel.

At block 262 of the process 260 of FIG. 2B, the keypoint determination engine 250 can process the input image 261 to determine keypoints associated with one or more objects (e.g., a hand, multiple hands, or other object) in the image 261. In one illustrative example, the keypoints can be determined from the image 261 using the machine learning system 252. For instance, the image 261 can be input to the machine learning system 252. The machine learning system 252 can process the image 261 to output the keypoints detected from the image 261. The machine learning system 252 can include a neural network trained to determine keypoints from images, such as using the backpropagation techniques describe with respect to FIG. 8 and FIG. 9.

The keypoints correspond to particular portions of the one or more objects in the image 261. In one illustrative example, the image 261 can include one or more hands. In some cases, the image 261 can include a physical object held by or in proximity to (e.g., occluded by) the one or more hands. In such an example, each keypoint can correspond to a joint of the one or more hands in the image 261 (and in some cases to points of the physical object held by or in proximity to the hand). In some cases, the machine learning system 252 can process the image 261 to generate a map (which can be referred to as a heatmap) or array of points associated with the input image, such as the map 263 shown in FIG. 2B. The map or array can be a two-dimensional (2D) map or array of points. For instance, the map can be an image having a 2D array of numbers, with each number including a value that is within a particular range of values (e.g., a range of values between 0 and 1).

In some examples, the keypoint determination engine 250 (e.g., the machine learning system 252) can determine keypoints associated with the one or more hands (and in some cases the physical object) in the image 261 at least in part by extracting a set of candidate 2D locations for joints of the one or more hands (and/or the physical object) from the map 263. In one example, the keypoint determination engine 250 (e.g., the machine learning system 252) selects the extremums of the map 263 as the set of candidate 2D locations for the joints. For instance, at the locations in the map 263 that correspond to features of interest in the image 261 (e.g., joints of the one or more hands), the map 263 can have values that are close to (e.g., within a threshold difference, such as 0.1, 0.15, 0.2, etc.) the maximum value of the range of possible values for the map 263 (e.g., a value of 1 in the example when the range includes values between 0 and 1). The extremums that are selected by the keypoint determination engine 250 can include the locations in the map 263 that are close to the maximum value (e.g., locations where the value is close to 1), such as within the threshold difference. In some examples, the keypoint determination engine 250 can ensure that two extremums are not too close to each other using a non-maximum suppression technique.

While joints are used herein as representative features of the hand, other portions of the hand can be used in other examples. In some implementations, when one or more physical objects are in the image (e.g., held by the one or more hands or in proximity to the one or more hands), the keypoint determination engine 250 can generate a map (e.g., map 263) for the hands and can generate a separate map for the one or more objects. In some examples, when an image includes one or more physical objects other than hands, the keypoint determination engine 250 (e.g., using the machine learning system 252) can perform object segmentation to segment the one or more physical objects from the background and/or other objects in the image (e.g., from one or more hands in the image). For instance, the keypoint determination engine 250 can generate a segmentation map or image that includes values corresponding to the one or more objects. The keypoint determination engine 250 can select (e.g., by randomly selecting) points inside the segmentation map and can use the selected points as keypoints for the one or more objects. In examples when the image includes the one or more objects and one or more hands, the keypoint determination engine 250 can also generate a map (e.g., the map 263, such as a heatmap) for the one or more hands and determine keypoints for the one or more hands, as described above.

In some cases, it is not required that all keypoint locations correctly correspond to a particular portion of the one or more objects (e.g., a joint of a hand) in the image 261. In some cases, all of the particular portions of the one or more object in the image 261 (e.g., all joints of one or more hands in the image 261) may not be detected from the image 261, such as due to occlusions and/or other factor(s).

At block 264 of the process 260 of FIG. 2B, the feature determination engine 254 of the pose estimation system 200 can determine features based on the keypoints determined from the image 261. For instance, as noted above, the machine learning system 252 can include a neural network used to determine the keypoints (e.g., based on the 2D map 263). The neural network of the machine learning system 252 can include multiple layers (e.g., convolutional layers, which can be followed by other layers such as pooling layers, activation functions, etc.) that are used to process the image data of the image 261. As described with respect to FIG. 8 and FIG. 9, each layer can include filters or nodes that are used to process data associated with the image 261, resulting in one or more feature maps (or feature array) being generated by each layer. The feature maps can be stored, such as in the storage 226. For instance, each filter or node can include an array of parameter values (e.g., weights, biases, etc.) that are applied to the output of a previous layer in the neural network of the machine learning system 252. The parameter values can be tuned during training, as described with respect to the examples of FIG. 8 and FIG. 9. In one illustrative example, the neural network of the machine learning system 252 includes a U-net neural network that includes an encoder portion and a decoder portion.

Using the keypoints, the feature determination engine 254 can determine or extract features from one or more of the feature maps of certain layers of the neural network of the machine learning system 252 (e.g., of the last M layers, where M is a positive integer value). For instance, features in a feature map sharing the same spatial locations (in 2D) as the keypoints in the 2D map 263 can be extracted for representing the keypoints. In some examples, the feature determination engine 254 can determine linearly interpolated features from multiple layers of a decoder portion of the neural network of the machine learning system 252, resulting in multi-scale features due to each layer have a different scale or resolution. In some cases, when a feature map has a different resolution or dimension as compared to the 2D map output by the neural network of the machine learning system 252, the feature map or the 2D map can be upscaled or downscaled so that the feature map and the 2D map have a same resolution. In one illustrative example, the map 263 can have a resolution of 128×128 pixels (in the horizontal and vertical directions), and the feature maps from the various layers can have varying resolutions. The map 263 can be upscaled (by increasing the resolution) or downscaled (by decreasing the resolution) to match the resolution of each feature map from which features are being extracted. Such scaling can allow the feature determination engine 254 to extract features from correct locations (e.g., that accurately correspond to the locations of the keypoints in the map 263) within the feature maps.

The feature determination engine 254 can generate feature representations for representing the determined features. An example of a feature representation is a feature vector. In some cases, the feature determination engine 254 can determine a feature representation (e.g., feature vector) for each keypoint determined by the keypoint determination engine 250. For instance, the feature determination engine 254 can combine the features (e.g., by concatenating the features) from multiple layers of the neural network of the machine learning system 252 that correspond to a particular keypoint to form a single feature vector for the particular keypoint. In one example, for a keypoint at location (3, 7) in the map 263 (corresponding to the third column and the seventh row in the 2D array of the map 263), the feature determination engine 254 can combine (e.g., concatenate) into a single feature vector all features corresponding to the location (3, 7) from various feature maps from the neural network. In some examples, the feature representations can be generated as appearance and spatial encodings of the locations from the map 263. For instance, as described in more detail below, the feature determination engine 254 can combine (e.g., concatenate) a positional encoding with the features extracted for a particular keypoint to form a feature representation (e.g., feature vector) for the particular keypoint.

The pose estimation engine 256 can use the feature representation(s) as input for determining a correct configuration of the particular portions of the one or more objects (e.g., the joints of the hand or hands) and the 3D poses of the one or more objects (e.g., the 3D pose of both hands in an image, the 3D pose of one or more hands and a physical object held by or in proximity to the hand(s), etc.). For instance, at block 266 of the process 260 of FIG. 2B, an encoder of the machine learning system 257 can process the feature representation(s) output by the feature determination engine 254 to determine classifications for the particular portions of the one or more objects. For example, the encoder of the neural network of the machine learning system 257 can process feature representations of the one or more hands in the image 261 to determine a joint class or joint type for each of the feature representations. The joint classes (or classifications) are illustrated in the image 267 of FIG. 2B. At block 268 of the process 260 of FIG. 2B, a decoder of the neural network of the machine learning system 257 can process the classifications (and in some cases learned queries, such as the learned joint queries described below) to determine the 3D pose (illustrated in image 269) of the one or more objects in the image 261. For instance, using the classifications and the learned queries, the decoder of the neural network of the machine learning system 257 can determine 3D pose(s) of the one or more hands in the image 261 and/or the pose of a physical object held by or in proximity to (e.g., occluded by) the one or more hands. The machine learning system 257 can include a neural network that is separate from the neural network of the machine learning system 252. In one illustrative example, the neural network of the machine learning system 257 includes a transformer neural network including a transformer encoder and a transformer decoder. As described in more detail below, the 3D pose of the one or more hands (and/or a physical object) can be determined using various types of pose representations, such as parent-relative joint vectors, parent-relative 2.5 dimensional (2.5D) poses, or joint angles (or other point angles).

As noted above, two-hand pose estimation can be difficult and existing solutions are deficient for various reasons. The pose estimation system 200 of FIG. 2A can be used to identify the joints of both hands (or the joints of one or both hands and locations of points on another physical object being held by or in proximity to the hand or hands in an image) and to predict their 3D locations and/or angles jointly using the neural network of the machine learning system 257 (e.g., a transformer neural network), as described herein. For instance, as noted above, the keypoint determination engine 250 and the feature determination engine 254 can localize the joints in 2D using determined keypoints (e.g., determined as local maximums in a 2D map or heatmap), which can result in accurate 3D poses. At this stage, the keypoints may not yet be associated with specific joints. In some cases, one or more keypoints may not correspond to joints at all, and some joints may not be detected as keypoints (e.g., due to occlusions or other factor(s)). The keypoints, however, can provide a useful starting point for predicting an accurate 3D pose for both hands (and/or one or both hands and a physical object held by or in proximity to the hand or hands in an image). The pose estimation engine 256 can perform a joint-association (or classification) and pose estimation using the neural network of the machine learning system 257 (e.g., a transformer encoder-decoder architecture) trained end-end along with the neural network of the machine learning system 252 used to detect the keypoints. Such a system architecture collaboratively analyzes the hand joint locations in the input image, leading to more reliable pose estimates than other existing approaches, such as during close interactions of the hands and/or other physical objects. The neural network architecture (e.g., a transformer neural network architecture) of the machine learning system 257 can also accept varying numbers of inputs, allowing the system to handle the fact that different numbers of keypoints can be detected in different input images. The two properties of self-attention and varying number of inputs of a transformer neural network can allow the machine learning system 257 to accurately determine 3D poses of the hands and/or other physical objects in the image.

As previously noted, the machine learning system 257 of the pose estimation engine 256 can include a transformer neural network in some implementations. The transformer architecture can be designed to estimate single-hand poses, two-hand poses, and hand(s)-object poses (where a physical object is being held by or is in proximity to one or more hands in an image) from an input image (e.g., an RGB image). The transformer neural network can model relationships between features at various locations (e.g., every location) in an image, which in some cases can increase the computational complexity as the resolution of the feature map increases. In general, due to such a constraint of transformer neural networks, transformers typically work on lower resolution feature maps which do not capture finer image details such as closely spaced hand joints. As indicated by the experimental results provided below, lower resolution feature maps may not be sufficient to accurately estimate hand poses. One solution to address such a concern can be to allow features at every spatial location to attend to a small set of features from sampled locations across different scales, resulting in more accurate detection of small objects in the image. The pose estimation system 200 can model relationships between sampled features from high resolution and low resolution feature maps, where the sampling locations are the keypoints provided by a convolutional neural network (CNN) which is effective in detecting finer image details. For the task of pose estimation, sparsely sampled features are effective in accurately estimating 3D pose of hands and/or physical objects when closely interacting with each other.

Figure 3:
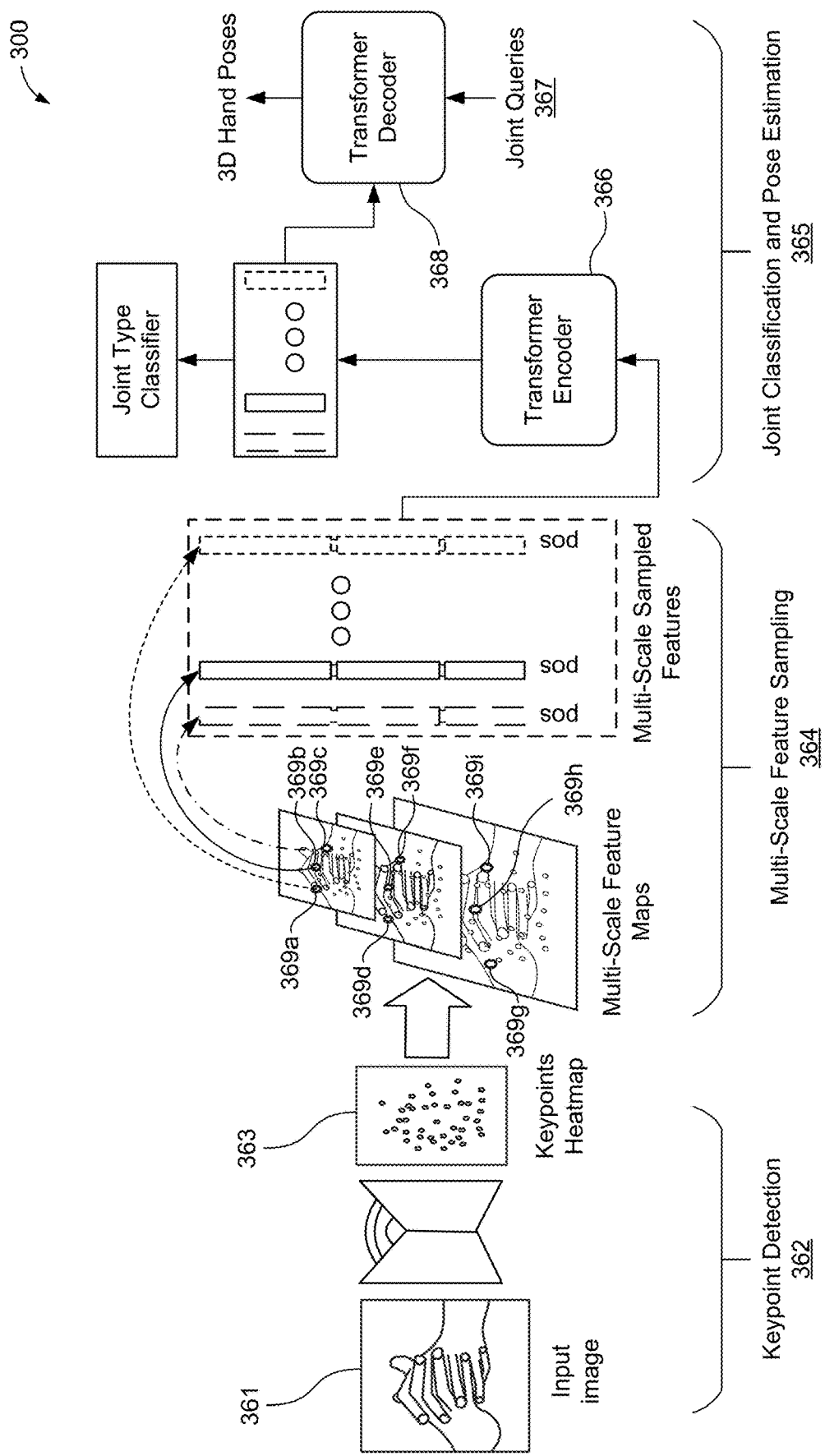
FIG. 3 is a diagram illustrating another example of a process for determining poses one or more objects from an input image, in accordance with some examples.

FIG. 3 is a diagram illustrating another example of a process 300 that can be performed by the pose estimation system 200. In the example process 300, a U-net neural network (including an encoder portion and a decoder portion) is used as an example implementation of the machine learning system 252 of the keypoint determination engine 250, and a transformer neural network (including a transformer encoder 366 and a transformer decoder 368) is used as an example implementation of the machine learning system 257 of the pose estimation engine 256. The process 300 will be described as estimating the pose of two hands in an image (e.g., the two hands of the image in FIG. 1A). However, it will be understood that the process 300 can be used to estimate a pose of a single hand and a pose of a physical object (e.g., a bottle) being held by or in proximity to the hand (e.g., occluded by the hand or occluding the hand), poses of two hands and poses of one or more physical objects being held by or in proximity to the two hands, and/or poses of two or more physical objects that are interacting with (e.g., in contact with, occluded by, etc.) each other.

At operation 362, the machine learning system 252 of the pose estimation system 200 can process an input image 361 to generate a keypoints heatmap 363. As noted above, the machine learning system 252 is shown in FIG. 3 as a U-net neural network. The machine learning system 252 can perform keypoint detection to detect keypoints (from the keypoints heatmap 363) that are likely to correspond to 2D hand locations in the input image 361. At operation 364, the feature determination engine 254 of the pose estimation system 200 can encode features (e.g., encoded as feature vectors) that are extracted from the machine learning system 252 based on the keypoints from the heatmap 363. For instance, the feature determination engine 254 can use the keypoints to determine which features to extract from one or more of the feature maps generated by a decoder portion of the U-net neural network.

At operation 365, the pose estimation system 200 can use the encoded features as input to a transformer encoder 366 (which can be part of the machine learning system 257 of the pose estimation engine 256). The transformer encoder 366 can determine joint type classes or types for each feature representation (corresponding to each visible joint in the image 361) of the one or more hands in the image 361. Using learned joint queries 367 (described below) and the joint classes output by the transformer encoder 366, the transformer decoder 368 can predict pose parameters relative to each joint of both hands. In some cases, the transformer decoder 368 can also predict additional parameters, such as the translation between the hands and/or hand shape parameters. In some examples, the pose estimation system 200 can consider an auxiliary loss on the transformer encoder 366 to recognize the keypoints. The auxiliary loss may not directly affect the pose estimates, but can guide the transformer decoder 368 to select more appropriate features, thus significantly improving the accuracy.

Further details regarding operations 362 and 364 of the process 300 (performing keypoint detection and encoding) will now be described. At operation 362, given the input image 361, the keypoint determination engine 250 (e.g., using the machine learning system 252) can extract keypoints that are likely to correspond to 2D hand joint locations. In one illustrative example, the machine learning system 252 can predict the keypoints heatmap 363 (which can be denoted as heatmap H) from the input image 361 using a U-net architecture. The predicted heatmap 363 may have a single channel (e.g., a single value, such as a value between 0 and 1 as described above). For instance, the heatmap 363 can have a dimension of 128×128×1 (corresponding to a 128×128 2D array with a single value for each location in the 2D array). In some cases, the keypoint determination engine 250 can select the local maximums of the heatmap 363 as the keypoints, as described above with respect to FIG. 2A. In one illustrative example, the keypoint determination engine 250 can determine a maximum of N keypoints (eg., with N=100 or other integer value), such as by determining the N local maxima of the heatmap 363. At this stage, the pose estimation system 200 may not attempt to recognize which keypoint corresponds to which joint.

The keypoint determination engine 250 can compute a ground truth heatmap $\mathcal{H}^*$ by applying a 2D Gaussian kernel at each of a number of ground truth joint locations and using an L2 norm loss to learn to predict the heat map $\mathcal{H}$:

$$\mathcal{L}_{\mathcal{H}} = \|\mathcal{H} - \mathcal{H}^*\|_2^2. \tag{1}$$

The ground truth joint locations can include annotated joint locations (labels used for training) that are provided with the dataset used for training (and in some cases testing). The annotated joint location label can be as training data for supervised training of the machine learning system 252 and/or the machine learning system 257. For instance, the loss function provided by equation (1) can be used to determine the loss based on the predicted locations of the joints in the heat map $\mathcal{H}$ output by the machine learning system 252 and the ground truth joint locations provided by the labels. Based on the loss at each training iteration or epoch, the parameters (e.g., weights, biases, etc.) of the machine learning system 252 can be tuned to minimize the loss.

In some cases, the U-net architecture uses a ResNet architecture up to the C5 layer as a backbone, followed by upsampling and convolutional layers with skip connections. In one illustrative example, the input image 361 can have a resolution of 256×256 pixels and the heatmap 363 can have a resolution of 128×128 pixels.

At operation 364, the feature determination engine 254 can then extract features around each keypoint from one or more feature maps of the machine learning system 252 (e.g., all or some feature maps from the decoder portion of the U-net architecture). For instance, in some examples as shown by the dots 369a, 369b, 369c, 369d, 369e, 369f, 369g, 369h, and 369i in FIG. 3, the feature determination engine 254 can determine linearly interpolated features from multiple layers of the U-net decoder. The linearly interpolated features can be extracted from the feature maps. The feature determination engine 254 can use the extracted features and in some cases spatial encodings to represent the keypoints as feature representations (e.g., feature vectors). The feature determination engine 254 can combine the features (e.g., by concatenating the features from the different feature maps) to form a feature representation, such as a feature vector. For instance, the feature determination engine 254 can concatenate the features to generate a 3968-dimension (3968-D) feature vector. In some cases, the feature determination engine 254 can reduce the 3968-D feature vector down to a 224-D encoding vector using a three-layer multilayer perceptron (MLP). In some examples, the feature determination engine 254 can further combine (e.g., concatenate) a spatial or positional encoding (e.g., a 32-D sine positional encoding). Using the 224-D encoding vector from the example above, the 32-D sine positional encoding vector can be combined with the 224-D encoding vector to form a 256-D vector representation of each keypoint. The 256-D vector representation of each keypoint can be provided as input the transformer encoder 366. In some cases, the keypoint detection through non-maximum suppression is non-differentiable and the gradients do not flow through the peak detection operation while training.

The feature determination engine 254 can output the feature representations to storage 226 (in which case the transformer encoder 366 can obtain the feature representations from the storage 226) and/or can provide the feature representations as input to the transformer encoder 366. The transformer encoder 366 and transformer decoder 368 can use the feature representations (e.g., each 256-D vector representation noted above) to predict a 3D pose of the two hands in the input image 361. Once operations 362 and 364 are performed, an encoding vector $\mathcal{F}_i$ is generated for each keypoint $K_i$. For example, the encoding vector $\mathcal{F}_i$ can be the 256-D vector representation noted above. The transformer encoder 366 can use the encoding vectors $\mathcal{F}_i$ as input. The transformer encoder 366 can include self-attention modules or engines that model a relationship between the keypoints associated with the encoding vectors $\mathcal{F}_i$ and can generate global context-aware features that help associate each keypoint with a hand joint (e.g., by classifying the encoding vectors $\mathcal{F}_i$ into joint classes or types). In some implementations, to help the transformer encoder 366 model such relationships, an auxiliary joint association loss can be used to train the transformer encoder 366. Using learned joint queries 367 as input, the transformer decoder 368 processes the joint-aware (based on the joint classes or types) features from the transformer encoder 366 to predict the 3D pose of the hands in the input image 361.

The learned joint queries 367 used by the transformer decoder 368 can correspond to the joint-type embeddings. The joint queries 367 can be transformed through a series of self-attention and cross-attention modules in the decoder. For instance, for each joint query, the cross-attention module or engine in the decoder 368 can soft-select the features from the transformer encoder 366 that best represent the hand joint being queried and can transform the selected features (e.g., by passing the features through one or more layers, such as one or more MLP layers). For instance, the cross-attention module or engine can soft-select the features by determining a linear combination of the features. The transformed features can then be provided to a feed-forward network (FFN) within the transformer decoder 368 to predict joint-related pose parameters. The FFN can include two MLP layers, a linear projection layer, and a softmax layer with a standard cross-entropy loss ($\mathcal{L}_{CE}$). In some examples, multiple decoder layers can be used. In some cases, the transformer decoder 368 can predict the pose after each decoder layer using FFNs with shared weights. For example, a cross-entropy loss can be applied after each layer. The FFN used for joint type prediction can share the weights across layers. In some examples, along with the joint queries 367, the transformer decoder 368 can use an additional learned query to predict relative translation $\hat{T}_{l \to r}$ between the hands, MANO hand shape parameters $\hat{\beta}$ (e.g., which can be 10-dimensional or 10-D), and/or weak perspective camera model parameters (scale $\hat{s}_c \in \mathbb{R}^+$ and 2D translation $\hat{t}_c \in \mathbb{R}^2$).

In some examples, a ground truth joint type for a detected keypoint at $(x_i, y_i)$ can be obtained by performing a proximity test. For instance, a keypoint can be assigned a joint type of the nearest joint in the 2D image plane if the distance to the nearest joint is less than a threshold distance γ. When multiple joints are within a distance of the threshold distance γ from the keypoint, the joint with the least depth can be selected as the joint type for that key point. If there are no joints within the threshold distance γ, the keypoint can be assigned to a background class. In some cases, such a joint association can result in multiple keypoints being assigned to a single joint type. However, as noted above, the joint associations are not directly used in the pose estimation, but rather as a guide for the transformer decoder to select appropriate features for pose estimation.

The pose estimation system 200 can output the 3D pose(s) 258 for the one or more objects in an input image. In some cases, a 3D pose can include 3D pose parameters defining the orientation and/or translation of an object in the input image (e.g., of the hands in an image). The pose parameters can be defined using various pose representations, as described below. The pose estimation system 200 can use the 3D pose(s) 258 for various purposes, such as to generate a 3D model of the object in the determined pose, to perform an operation based on the pose (e.g., navigate a vehicle, robotic device, or other device or system around the object), among other uses. In implementations when a 3D model is generated, the 3D model can be displayed (e.g., by a mobile device, by an XR system, and/or by other systems or devices), used to determine locations of an object represented by the 3D model (e.g., for scene understanding and/or navigation, for object grasping, for autonomous vehicle operation, and/or for other uses), among other uses.

Various pose representations and losses can be used for the estimated 3D poses 258. In some cases, regressing 3D joint locations directly can be more accurate (in terms of joint error) than regressing model parameters, such as MANO joint angles from CNN architectures. However, regressing MANO joint angles provides access to a complete hand mesh required for modeling contacts and interpenetration during interactions or for learning in a weakly-supervised setup. The pose estimation system 200 can be configured to output multiple types of pose representations (e.g., 3D joint locations and joint angles). Using the techniques described herein, the pose estimation system 200 can provide joint angle representations while achieving competitive performance compared to that of joint location representations.

Examples of pose representations that can be used include parent-relative joint vectors $\hat{V}$, parent-relative 2.5D pose $\hat{J}_{2.5D}$, and MANO joint angles $\hat{\theta}$. The parent-relative joint vectors and the MANO joint angles can be root-relative poses. For the parent-relative 2.5D pose, absolute root depth is used to reconstruct the full pose from the estimated parameters, resulting in absolute poses.

In some cases, the root-relative 3D joint locations $\hat{J}_{3D}^r$ of each hand are projected to the image plane using the weak perspective camera model as, $$\hat{J}_{proj}=\hat{s}_c\Pi(\hat{J}_{3D}^r)+\hat{t}_c, \quad (2)$$

Where $\Pi$ represents orthographic projection, $\hat{s}_c$ refers to scale parameters of the weak perspective camera model, and $\hat{t}_c$ refers to translation parameters of the weak perspective camera model.

For the parent-relative joint vectors $\hat{V}$ representation, each joint j can be associated with a 3D 'joint vector' $V_j$ given by $V_j=J_{3D}(j)-J_{3D}(p(j))$, where $J_{3D}$ is the 3D joint location and p(j) refers to parent joint index of point j. An advantage of the parent-relative joint vectors $\hat{V}$ representation is that it defines the hand pose relative to its root without requiring knowledge of the camera intrinsic parameters. Such a solution can be useful when camera intrinsic parameters are not available or are computational intensive to determine.

Figure 4:
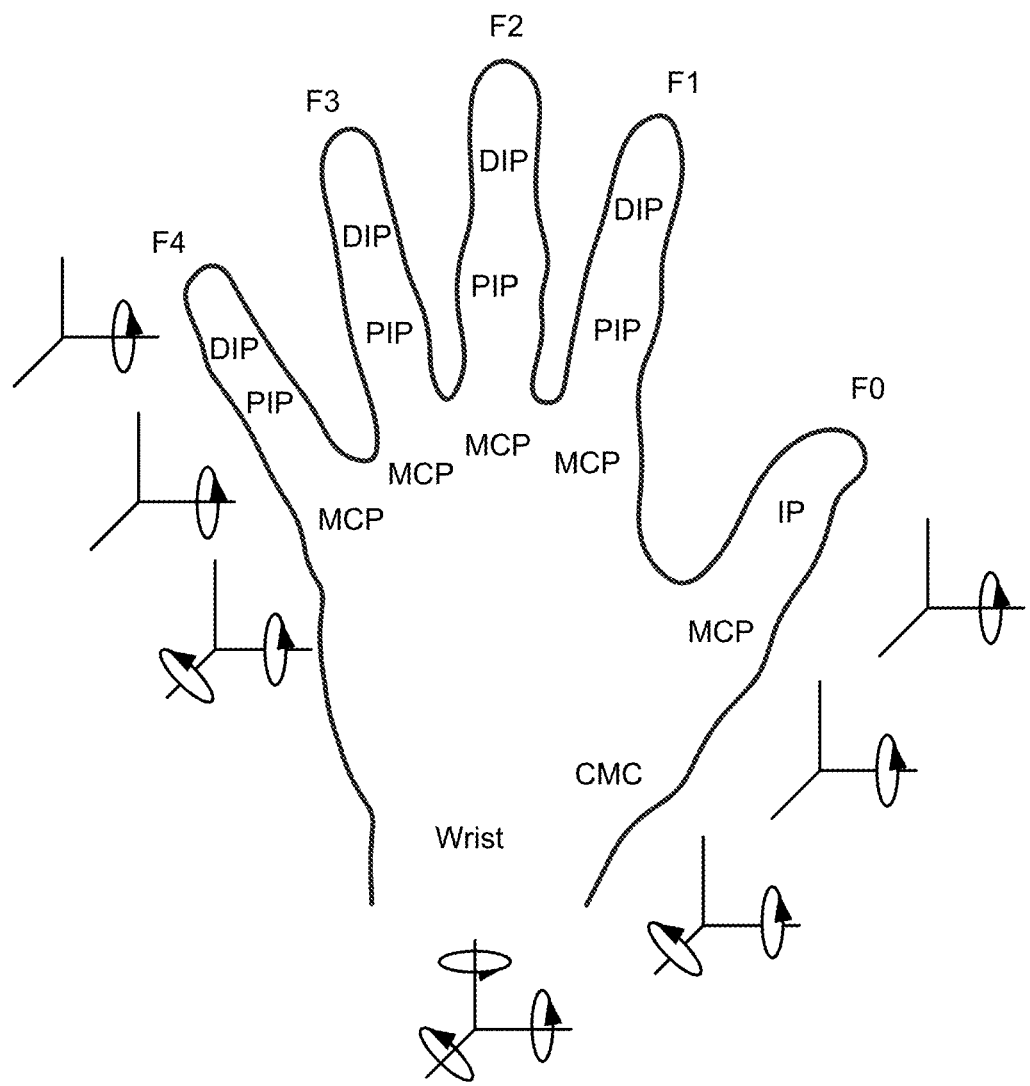
FIG. 4 is a diagram illustrating an example of a hand with various joints and associated joint labels or identifiers, in accordance with some examples.

FIG. 4 is a diagram illustrating an example of a hand with various joints. Each joint in FIG. 4 has a label according to the type of joint, including the thumb tip (F0), the index finger tip (F1), the middle finger tip (F2), the ring finger tip (F3), the pinky finger tip (F4), distal interphalangeal (DIP) joint, proximal interphalangeal (PIP) joint, metacarpophalangeal (MCP) joint, interphalangeal (IP) joint, and the Carpo-Metacarpal (CMC) joint. Each joint has a parent joint. In one example, the parent joint of the DIP joint is the PIP joint, the parent joint of the PIP joint is the MCP joint, and so on. Using the parent-relative joint vectors $\hat{V}$ representation, a 3D vector can be determined from each joint to its parent joint (or alternatively from the parent joint to the child joint). In some cases, 20 joint vectors per hand can be determined, such as one joint vector for each joint shown in FIG. 4 to each respective parent joint (or alternatively from a parent joint to each respective child joint). From the joint vectors, the pose estimation system 200 can compute the root-relative 3D location of each joint by performing an accumulation function (e.g., by summing the parent-relative joint vectors).

When using the parent-relative joint vectors $\hat{V}$ representation, a neural network of the machine learning system 257 of the pose estimation engine 256 can be trained using a 3D joint loss (denoted as $\mathcal{L}_{J3D}(\hat{J}_{3D}^r, J_{3D}^{r*}))$ and a joint vector loss (denoted as $\mathcal{L}_v(\hat{V}, V^*)$, where $J_{3D}^{r*}$ and $V^*$ represent the ground truth values. In some cases, the neural network of the machine learning system 257 can be trained using a reprojection loss (denoted as $\mathcal{L}_{proj}(\hat{J}_{proj}, J_{2D}^*))$, where $J_{2D}^*$ is the ground truth 2D joint locations and $\hat{J}_{proj}$ is a weak perspective camera projection (such as the weak perspective camera projection defined in Equation (2) above). The losses can be computed using L1 distance between the estimated and ground-truth values. The pose loss can be defined as, $\mathcal{L}_{pose}=\mathcal{L}_{J3D}+\mathcal{L}_v+\mathcal{L}_{proj}$.

For the parent-relative 2.5D pose representation, each joint is parameterized by its 2D location $J_{2D}$ and the difference $Z^p$ between its depth and the depth of its parent joint. The camera intrinsic parameters matrix K and the absolute depth of the root (wrist) joint $Z_{root}$ or the scale of the hand are then used to reconstruct the 3D pose of the hand in camera coordinate system as follows:

$$J_{3D} = K^{-1} \cdot (Z^r + Z_{root}) \cdot \begin{pmatrix} J_{2D_x} \\ J_{2D_y} \\ 1 \end{pmatrix}, \quad (3)$$

where $Z^r$ is the root-relative depth of the joint obtained from $Z^p$ and $J_{2D_x}, J_{2D_y}$ are the x and y coordinates of $J_{2D}$. Each joint query is used as input to the transformer decoder 368 to predict $J_{2D}$ and $Z_p$ for each of the 20 joints and a point on the wrist (labeled as "wrist" in FIG. 4). In some cases, 43 joint queries can be used when estimating the 2.5D pose (including one query for relative hand translation, such as at the wrist location in FIG. 4).

The pose estimation engine 256 can predict the root depth $Z_{root}$ separately using the machine learning system 257. For example, a neural architecture of the machine learning system 257 can be trained using an L1 loss on the 2D joint locations $\mathcal{L}_{J2D}$ ($\hat{J}_{2D}, J_{2D}^*$) and the relative depths $\mathcal{L}_Z$ ($Z^p, Z^{p*}$), where $\hat{J}_{2D}, \hat{Z}^p$ and $J_{2D}^*, Z^{p*}$ are the estimated and groundtruth 2.5D poses. The pose loss can be given by $\mathcal{L}_{pose}=\mathcal{L}_{J2D}+\mathcal{L}_Z$.

In the MANO joint angles representation, each 3D hand pose can be represented by 16 3D joint angles in a hand kinematic tree. In such examples, to train the neural network architecture of the machine learning system 257 of the pose estimation engine 256, an L1 loss can be used on the 3D joint locations $\mathcal{L}_{J3D}$ ($\hat{J}_{3D}^r(\hat{\theta},\hat{\beta}), J_{3D}^{r*}$), the joint angles $\mathcal{L}_\theta(\hat{\theta}, \theta^*)$, and the joint reprojections, $\mathcal{L}_{proj}=\hat{J}_{proj}, J_{2D}^*$. The total pose loss can be given by $\mathcal{L}_{pose}=\mathcal{L}_{J3D}+\mathcal{L}_\theta+\mathcal{L}_{proj}$. The joint angle loss can behave as a regularizer and can avoid unrealistic poses. In some cases, the pose estimation engine 256 can only estimate a root-relative pose in this representation, and thus may not require camera intrinsic parameters to estimate the pose. Such a representation can thus be advantageous when the camera intrinsic parameters are not available.

In some examples, the pose estimation system 200 (e.g., the machine learning system 252 and the machine learning system 257) can be trained end-to-end by performing end-to-end training with all the stages connected with final loss given as follows:

$$\mathcal{L} = \mathcal{L}_{\mathcal{H}} + \mathcal{L}_{CE} + \mathcal{L}_{pose} + \mathcal{L}_{trans}, \quad (4)$$

During the initial few epochs of the training, in which case the estimated keypoint heatmap may be less accurate, the groundtruth heatmap can provided to the multi-scale feature sampler and later switched to the estimated heatmap.

Table 1 below illustrates results of the systems and techniques described herein (the last three rows of the table) with three different pose representations on the InterHandV0.0 dataset. As shown in FIG. 3, the pose estimation system 200 achieves 14% higher accuracy than InterNet (described in Gyeongsik Moon, et al., "Interhand2.6m: A dataset and baseline for 3d interacting hand pose estimation from a single rgb image. In ECCV, which uses CNN architecture.

TABLE 1

| | Camera Intrinsics Needed | Mean Per Joint Position Error (MPJPE) in millimeters (mm) | | | Mean Relative-Root Position Error (MRRPE) in mm |
| --- | --- | --- | --- | --- | --- |
| | | Single Hand | Interacting Hands | All | |
| InterNet | Yes | 13.79 | 21.24 | 17.54 | 40.46 |
| Joint Vectors $\hat{V}$ | No | 13.86 | 18.49 | 16.19 | 33.80 |
| MANO Joint Angles* | No | 14.00 | 19.16 | 16.61 | 37.91 |
| MANO Joint Angles | No | 15.36 | 20.61 | 18.01 | 37.91 |
| 2.5D Pose | Yes | 11.73 | 17.69 | 14.73 | 34.40 |

The "*" for the first MANO joint angles entry of Table 1 indicates ground-truth 3D joints obtained from fitted MANO models. MPJPE measures the Euclidean distance (in mm) between the predicted and ground truth 3D joint locations after root joint alignment and indicates the accuracy of root-relative 3D pose. The alignment is carried out separately for the right hand and the left hand. MRRPE measures localization of the left hand relative to the right hand in Euclidean distance (in mm). The InterNet system uses a complete CNN architecture to predict 2.5D poses of interacting hands. The pose estimation system 200 achieves better accuracy than InterNet, particularly with respect to interacting hands, even when using joint vector representation which does not require camera intrinsic parameters to reconstruct the pose. When predicting 2.5D poses similar, the pose estimation system 200 achieves 3 mm (or 14%) improvement on interacting hands. Such results suggest that explicit modelling of the relationship between CNN features belonging to hand joints using a transformer is more accurate than directly estimating the pose with CNNs.

The parent-relative joint vector representation (which does not require camera intrinsic parameters to reconstruct root-relative pose) also outperforms InterNet, which require camera intrinsics and is slightly less accurate than the 2.5D pose representation. This drop in accuracy can be attributed to the fact that parent-relative joint vector representations predict the pose completely in 3D, unlike the 2.5D representation that partially predicts the pose in 2D and relies on known camera intrinsic parameters to project the pose to 3D. Table 1 also illustrates that, using the MANO joint angle representation, the pose estimation system 200 performs similarly to InterNet, which outputs direct 3D joint locations. This is significant in that previous works that estimate joint angle representation or its PCA components have reported results that are often inferior to methods that directly estimate 3D joint locations, indicating that regressing model parameters is harder than estimating joint locations. The example neural network architecture of the machine learning system 257 described above that softselects multi-scale CNN features specific to each joint location in the input image, with the help of the transformer architecture, enables accurate estimation of any joint-related parameter irrespective of its representation.

Another dataset on which the pose estimation system 200 can be assessed is the HO-3D dataset. The HO-3D dataset is useful to evaluate the pose estimation system 200 when estimating the pose of one or more hands and an object held by the hand(s) or in proximity to the hand(s). The HO-3D dataset includes hand-object interaction sequences with only the right hand and 10 objects from the YCB objects dataset. Annotations for training using the HO-3D dataset can be obtained automatically and cam include 66,000 training images and 11,000 test images. In some cases, 20 joint queries for hand pose, one query for weak perspective camera model parameters, and two queries for object pose can be used. Mean joint error after scale-translation alignment of the root joint and area-under-the-curve (AUC) metrics can be used to evaluate the hand pose results. The object pose can be computed with respect to the hand frame of reference. Mean 3D corner error ($err_{obj}(\hat{P}, P^*)$) can be used to evaluate the accuracy of object poses. In some cases, a variation of the 3D corner error ($errS_{obj}(\hat{P}, P^*)$) can be used to account for object symmetry, where $\hat{P}$ and $P^*$ refers to the estimated and ground-truth pose matrix, respectively. The object pose error metrics can be defined as:

$$err_{obj} = \frac{1}{8}\sum_{i=1}^{8}\|\hat{P}\cdot B_i - P^*\cdot B_i\| \qquad (5)$$

$$errS_{obj} = \min_{R\in S}\frac{1}{8}\sum_{i=1}^{8}\|\hat{P}\cdot B_i - P^*\cdot R\cdot B_i\|$$

where $B_i$ denotes the $i^{th}$ corner of the object bounding box and S denotes the set of 3D rotations of the object which does not change its appearance. The test set of HO-3D contains three seen objects (mustard bottle, bleach cleanser, and potted meat) and one object not seen in the training data. Only the seen objects for used for the evaluation below. The hand pose can be estimated using the joint vector representation and the technique can be trained and tested on 256×256 loosely cropped image patches.

Table 2 below illustrates the accuracy of the pose estimation system 200 evaluated on the HO-3D dataset relative to other approaches, including a technique described by Shreyas Hampali, et al., "Honnotate: A method for 3d annotation of hand and object poses," In CVPR, 2020 (referred to as "Honnotate" below); a technique described in Yana Hasson, et al., "Learning joint reconstruction of hands and manipulated objects," in CVPR, 2019 (referred to as "Learning Joint Reconstruction" below); and a technique described in Yana Hasson, et al., "Leveraging photometric consistency over time for sparsely supervised hand-object reconstruction," In CVPR, 2020 (referred to as "Leveraging Photometric Consistency" below).

Table 3 below compares the accuracy of the object poses estimated using the pose estimation system and Leveraging Photometric Consistency using mean object corner error. Leveraging Photometric Consistency estimates the object pose using a CNN backbone followed by fully connected layers that regress the object rotation (axis-angle representation) and object translation in the camera coordinate system. As Leveraging Photometric Consistency does not consider the symmetricity of objects, the results are shown with and without the symmetricity considered in training and testing. The pose estimation system 200 obtains more accurate hand-relative object poses. As shown in Tables 2 and 3, the pose estimation system 200 performs significantly better than existing approaches. All errors are in centimeters (cm).

TABLE 2

|  | Camera Intrinsics | Image Crop | Mean Joint Err. (cm) | AUC |
| --- | --- | --- | --- | --- |
| Honnotate | Yes | Yes | 3.04 | 0.49 |
| Learning Joint Reconstruction | No | Yes | 3.18 | 0.46 |
| Leveraging Photometric Consistency | Yes | No | 3.69 | 0.37 |
| Pose Estimation System 200 | No | Yes | 2.57 | 0.54 |

TABLE 3

|  | Symmetry | Metric | Mustard Bottle | Bleach Cleanser | Potted Meat Can | All |
| --- | --- | --- | --- | --- | --- | --- |
| Leveraging Photometric Consistency | No | $err_{obj}$ | 9.8 | 9.6 | 10.8 | 10.1 |
| Pose Estimation System 200 | No | $err_{obj}$ | 9.7 | 4.6 | 8.2 | 6.8 |
| Pose Estimation System 200 | Yes | $errS_{obj}$ | 3.4 | 4.6 | 7.1 | 5.6 |

Figure 5:
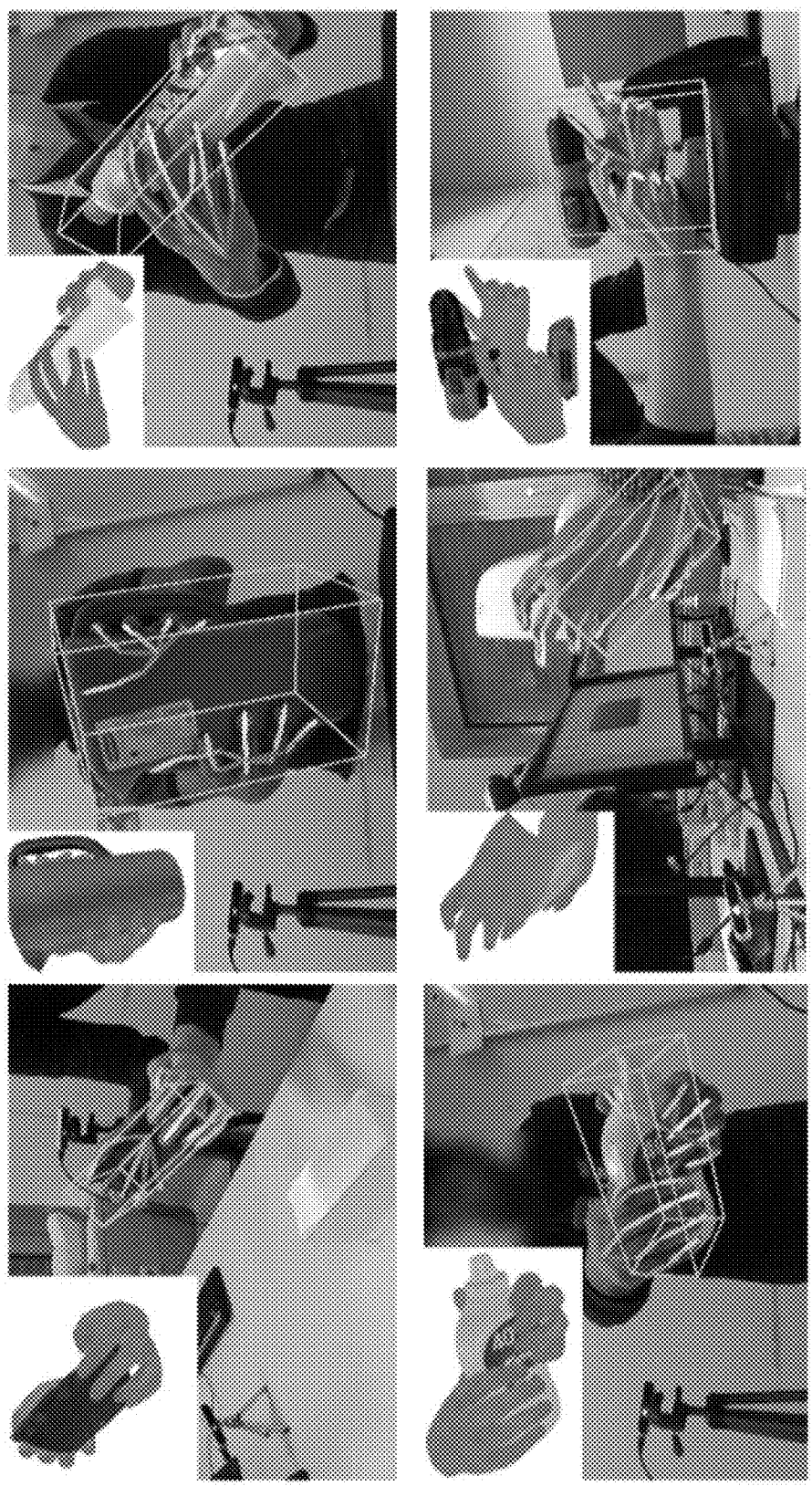
FIG. 5 includes example images from the $H_2O$-3D dataset and annotated poses, in accordance with some examples.

A dataset referred to as the H₂O-3D dataset is introduced, which contains 2hands+object 3D pose annotations and is an automatically annotated dataset. The dataset is captured with six subjects manipulating ten different YCB objects with a functional intent using both hands. The dataset is captured in a multi-view setup with five RGB-depth (RGBD) cameras and includes 50,000 training images and 12,000 test images. The H2O-3D dataset can be more challenging than previous hand interaction datasets due to large occlusions between the hands and the object. FIG. 5 includes example images from the H₂O-3D dataset and annotated poses. The pose estimation system 200 can estimate the parent-relative joint vector representation of the two hand poses (40 joint queries), the right hand relative translation of the left hand (1 query), and the right hand relative object pose (2 queries) with a total of 43 queries at the transformer decoder. The training data from the HO-3D dataset can be used, and the images can be flipped randomly during training to obtain right hand and left hand only images. This data can then be combined with H₂O-3D training dataset. The test set of H₂O-3D includes three objects seen in the training data (Pitcher Base, Bleach Cleanser, Power Drill). The object pose estimation accuracy can be evaluated only on these objects.

The accuracy of the hand pose is evaluated using the MPJPE metric after root joint alignment along with the MRRPE metric to evaluate the relative translation between the hands. The object pose is evaluated using symmetry-aware mean 3D corner distance metric defined in Equation (5). Table 5 below shows the accuracy of the estimated hand poses using the pose estimation system 200 on the H₂O-3D dataset. Due to large mutual occlusions, it is observed that estimating the translation between the hands is more challenging. Table 4 shows the accuracy of the object poses estimated by the pose estimation system 200.

TABLE 4

|  | Power Drill | Bleach Cleanser | Picture Base | All |
| --- | --- | --- | --- | --- |
| Pose Estimation System 200 | 6.2 | 4.3 | 20.2 | 13.5 |

TABLE 5

|  | MPJPE (mm) | MRRPE (cm) |
| --- | --- | --- |
| Pose Estimation System 200 | 2.84 | 9.08 |

Figure 6:
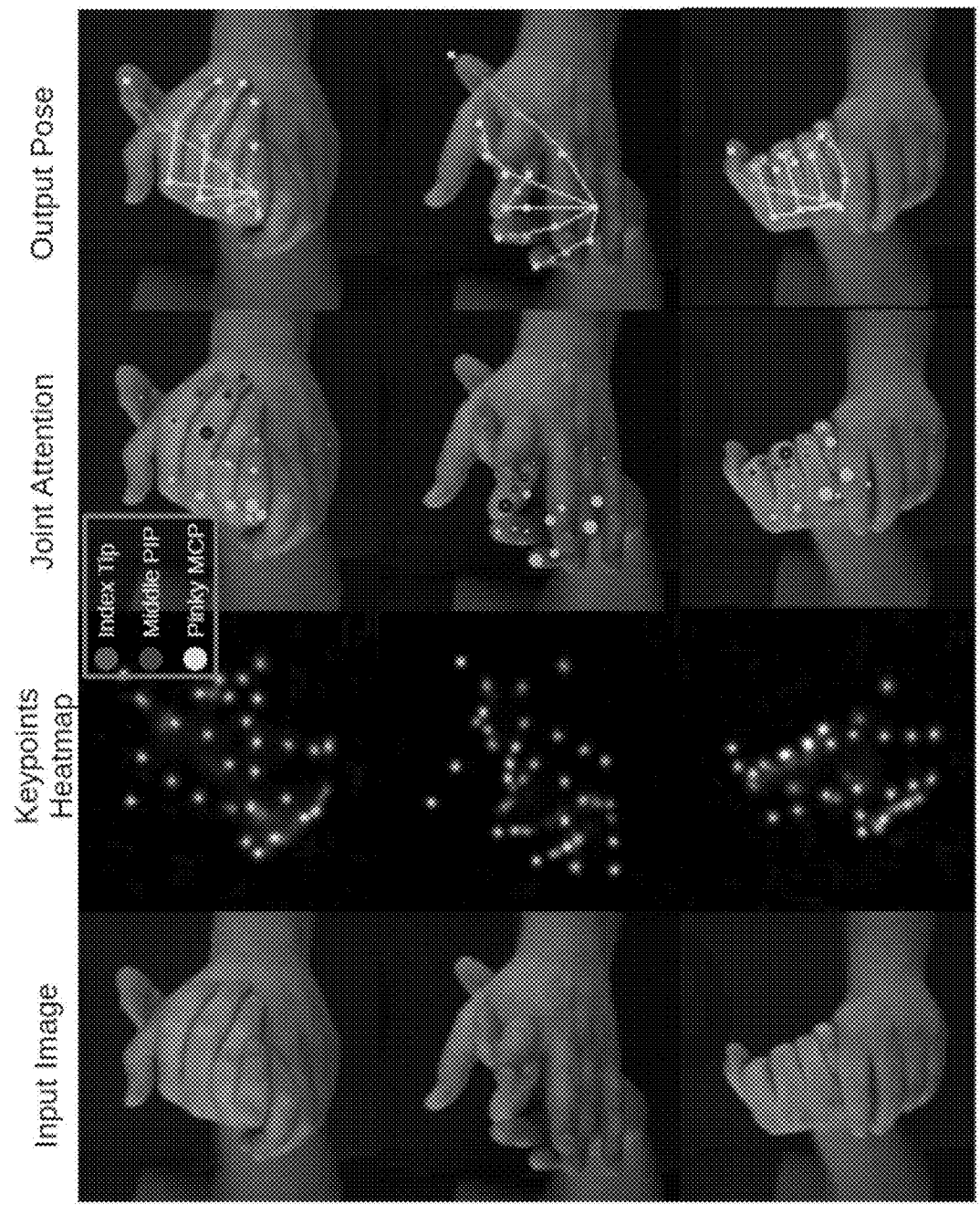
FIG. 6 is a diagram illustrating cross-attention for three joint queries of a right hand, in accordance with some examples.

FIG. 6 is a diagram illustrating cross-attention for three joint queries of the right hand, including an index fingertip joint (red), middle finger PIP joint (blue), and the pinky finger MCP joint (yellow). The first column includes input images, and the second column includes the keypoint heatmaps generated by the keypoint determination engine 250 for the input images. For each joint query, the respective colored circles in the third column (labeled "Joint Attention") indicate the locations of the keypoints attended by the query. The radius of the circle in the Joint Attention column is proportional to the attention weight. For each joint query, the transformer decoder 368 of FIG. 3 (as an example of a neural network that can be used for the machine learning system 257 of the pose estimation engine 256) can select the image features only from the location of the joint. The joint specific features enable estimation of different joint-related pose parameters, such as joint angle and joint vector. The output poses for the input images are illustrated in the fourth column of FIG. 6.

Figure 7:
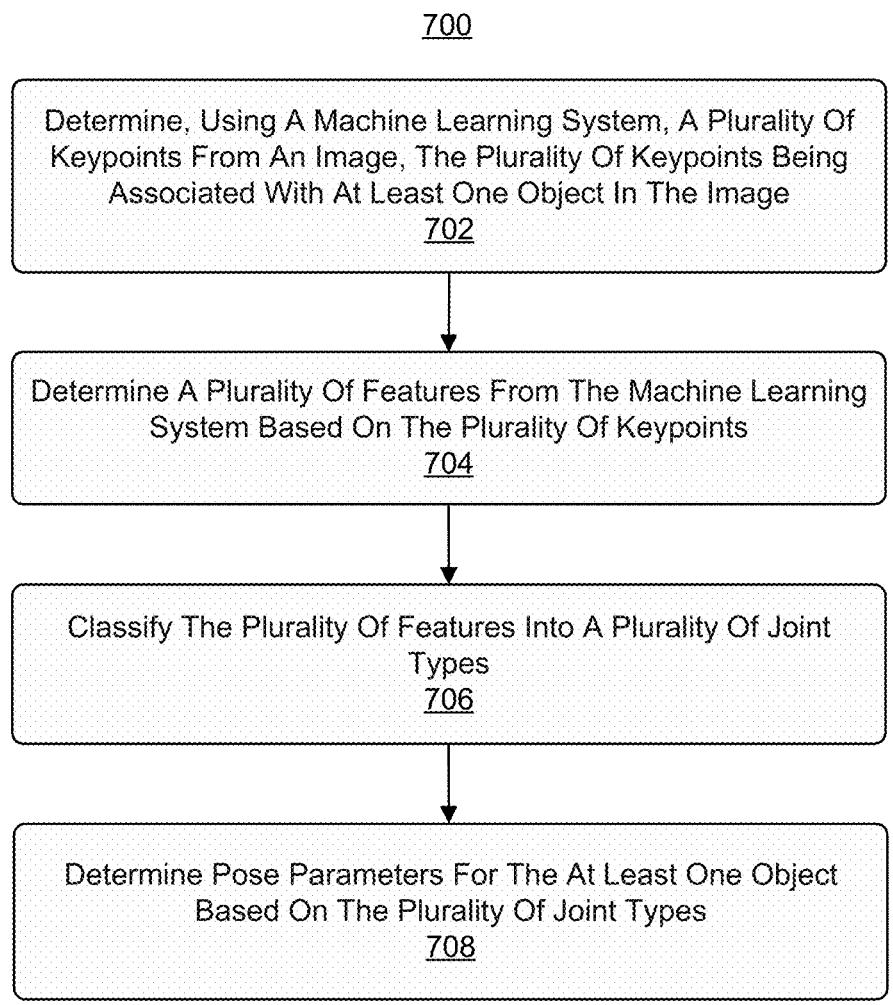
FIG. 7 is a flowchart illustrating an example of a process of determining one or more poses of one or more objects, in accordance with some examples.

FIG. 7 illustrates an example of a process 700 of determining one or more poses of one or more objects using the techniques described herein. Means for performing the functionality of one or more of the blocks illustrated in FIG. 7 may comprise hardware and/or software components of a computer system, such as a computer system having one or more of the components of the pose estimation system 200 of FIG. 2A and/or the computing device architecture 1000 illustrated in FIG. 10.

At block 702, the process 700 includes determining, using a machine learning system, a plurality of keypoints from an image. The plurality of keypoints are associated with at least one object in the image. In some cases, the at least one object includes at least one hand. In some examples, each keypoint of the plurality of keypoints corresponds to a joint of the at least one object (e.g., a joint of the at least one hand). In some aspects, the machine learning system includes a neural network that uses the image as input. In one illustrative example, the neural network is part of the machine learning system 252 of the keypoint determination engine 250 of FIG. 2A. Means for performing the functionality of block 702 can include one or more software and/or hardware components of a computer system, such as the keypoint determination engine 250 (e.g., utilizing the machine learning system 252), one or more components of the processing system 230 (e.g., the CPU 232, the GPU 234, the DSP 236, and/or the ISP 238), the processor 1010 of FIG. 10, and/or other software and/or hardware components of a computer system.

At block 704, the process 700 includes determining a plurality of features from the machine learning system based on the plurality of keypoints. In some examples, to determine the plurality of features from the machine learning system based on the plurality of keypoints, the process 700 can include determining, from a first feature map of the machine learning system, a first set of features that correspond to the plurality of keypoints. The first feature map includes a first resolution. The process 700 can further include determining, from a second feature map of the machine learning system, a second set of features that correspond to the plurality of keypoints. The second feature map includes a second resolution that is different than the first resolution.

Figure 10:
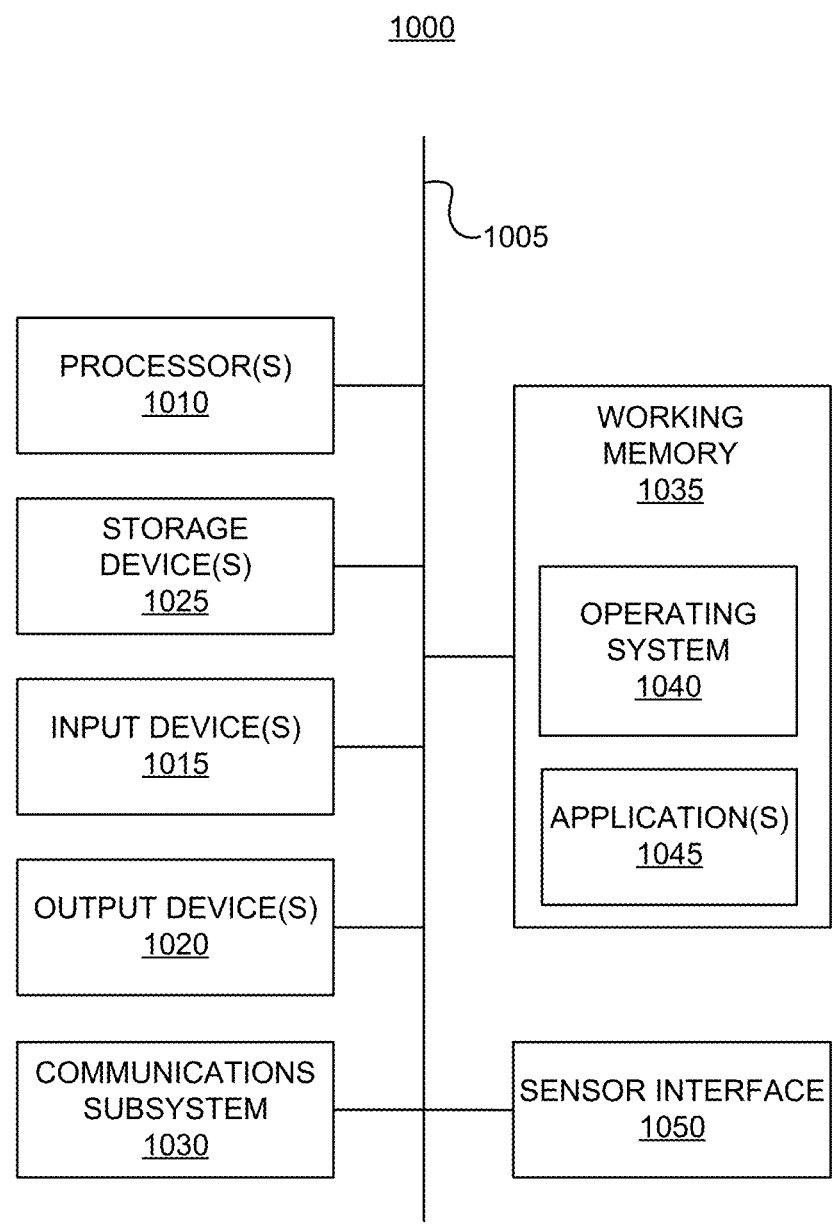
FIG. 10 illustrates an example of a computing system that can implement one or more of the techniques described herein, in accordance with some examples.

Means for performing the functionality of block 704 can include one or more software and/or hardware components of a computer system, such as the feature determination engine 254 (e.g., utilizing the machine learning system 252), one or more components of the processing system 230 (e.g., the CPU 232, the GPU 234, the DSP 236, and/or the ISP 238), the processor 1010 of FIG. 10, and/or other software and/or hardware components of a computer system.

At block 706, the process 700 includes classifying the plurality of features into a plurality of joint types. In some aspects, the process 700 can include generating a feature representation for each keypoint of the plurality of keypoints. In such aspects, the process 700 can classify the plurality of features into the plurality of joint types using the feature representation for each keypoint. In some cases, the feature representation for each keypoint includes an encoding vector.

Means for performing the functionality of block 706 can include one or more software and/or hardware components of a computer system, such as the pose estimation engine 256 (e.g., utilizing the machine learning system 257), one or more components of the processing system 230 (e.g., the CPU 232, the GPU 234, the DSP 236, and/or the ISP 238), the processor 1010 of FIG. 10, and/or other software and/or hardware components of a computer system.

At block 708, the process 700 includes determining pose parameters for the at least one object (e.g., at least one hand or other object) based on the plurality of joint types. In some examples, a neural network can be used to classify the plurality of features into the plurality of joint types and to determine the pose parameters. For instance, the process 700 can classify the plurality of features into the plurality of joint types using an encoder of a transformer neural network, and can determine the pose parameters for the at least one object (e.g., at least one hand or other object) based on the plurality of joint types using a decoder of the transformer neural network.

In some examples, the at least one object includes two objects. For instance, the plurality of keypoints includes keypoints for the two objects and the pose parameters include pose parameters for the two objects. In one illustrative example, using hands as an example of objects, the at least one object includes two hands. In such an example, the plurality of keypoints can include keypoints for the two hands and the pose parameters can include pose parameters for the two hands. In another illustrative example, the at least one object includes a single hand. In some examples, the image includes at least one hand (e.g., a single hand or two hands as an example of the at least one object) and at least one physical object held by or in proximity to (e.g., occluded by) the at least one hand. In such examples, the process 700 can include determining, using the machine learning system, a plurality of object keypoints from the image. The plurality of object keypoints are associated with an object associated with the at least one hand (e.g., an object held by the at least one hand or an object in proximity to the at least one hand). The process 700 can include determining pose parameters for the object based on the plurality of object keypoints using the techniques described herein.

In some examples, the pose parameters are determined for the at least one object (e.g., at least one hand or other object) based on the plurality of joint types and based on one or more learned joint queries. In some cases, the at least one hand includes a first hand and a second hand. In such cases, the one or more learned joint queries can be used to predict at least one of a relative translation between the first hand and the second hand, a set of object (e.g., hand or other object) shape parameters, and camera model parameters.

As described above, various types of pose representations can be used for the pose parameters. In some aspects, the pose parameters for the at least one object (e.g., at least one hand or other object) include a three-dimensional vector for each joint of the plurality of joint types. For example, the three-dimensional vector for each joint of the plurality of joint types can include a horizontal component, a vertical component, and a depth component. In another example, the three-dimensional vector for each joint of the plurality of joint types can include a vector between each joint and a parent joint associated with each joint. In some aspects, the pose parameters for the at least one object (e.g., at least one hand or other object) include a location of each joint and a difference between a depth of each joint and a depth of a parent joint associated with each joint. In some aspects, the pose parameters for the at least one object (e.g., at least one hand or other object) include a translation of the at least one object (e.g., at least one hand or other object) relative to another object (e.g., another hand or physical object) in the image. In some cases, the pose parameters for the at least one object (e.g., at least one hand or other object) include a shape of the at least one object (e.g., at least one hand or other object).

Means for performing the functionality of block 708 can include one or more software and/or hardware components of a computer system, such as the pose estimation engine 256 (e.g., utilizing the machine learning system 257), one or more components of the processing system 230 (e.g., the CPU 232, the GPU 234, the DSP 236, and/or the ISP 238), the processor 1010 of FIG. 10, and/or other software and/or hardware components of a computer system.

In some examples, the process 700 may be performed by a computing device or an apparatus, such as a computing device having the computing device architecture 1000 shown in FIG. 10. In one illustrative example, the process 700 can be performed by a computing device with the computing device architecture 1000 implementing the pose estimation system 200 shown in FIG. 2A. In some cases, the computing device or apparatus may include an input device, a keypoint determination engine (e.g., keypoint determination engine 250), a feature determination engine (e.g., feature determination engine 254), a pose estimation engine (e.g., pose estimation engine 256), an output device, one or more processors, one or more microprocessors, one or more microcomputers, and/or other component(s) that is/are configured to carry out the steps of process 700. In some examples, the computing device or apparatus may include a camera configured to capture images. For example, the computing device may include a camera device. As another example, the computing device may include or be part of a mobile device that may include one or more cameras (e.g., a mobile phone or tablet including one or more cameras), an XR device (e.g., a head-mounted display, XR glasses, or other XR device), a vehicle, a robotics device, or other device that may include one or more cameras. In some cases, the computing device can include communications transceiver and/or a video codec. In some cases, the computing device may include a display for displaying images. In some examples, a camera or other capture device that captures the video data is separate from the computing device, in which case the computing device receives the captured video data. The computing device may further include a network interface configured to communicate the video data. The network interface may be configured to communicate Internet Protocol (IP) based data or any other suitable data.

The components of the computing device (e.g., the one or more processors, one or more microprocessors, one or more microcomputers, and/or other component) can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 700 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 700 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

As noted above, various aspects of the present disclosure can use machine learning systems, such as the machine learning system 252 of the keypoint determination engine and the machine learning system 257 of the pose estimation engine 256. FIG. 8 is an illustrative example of a deep learning neural network 800 that can be used to implement the holistic video understanding system described above. An input layer 820 includes input data. In one illustrative example, the input layer 820 can include data representing the pixels of an input video frame. The neural network 800 includes multiple hidden layers 822a, 822b, through 822n. The hidden layers 822a, 822b, through 822n include "n" number of hidden layers, where "n" is an integer greater than or equal to one. The number of hidden layers can be made to include as many layers as needed for the given application. The neural network 800 further includes an output layer 821 that provides an output resulting from the processing performed by the hidden layers 822a, 822b, through 822n. In one illustrative example, the output layer 821 can provide a classification for an object in an input video frame. The classification can include a class identifying the type of activity (e.g., playing soccer, playing piano, listening to piano, playing guitar, etc.).

The neural network 800 is a multi-layer neural network of interconnected nodes. Each node can represent a piece of information. Information associated with the nodes is shared among the different layers and each layer retains information as information is processed. In some cases, the neural network 800 can include a feed-forward network, in which case there are no feedback connections where outputs of the network are fed back into itself. In some cases, the neural network 800 can include a recurrent neural network, which can have loops that allow information to be carried across nodes while reading in input.

Information can be exchanged between nodes through node-to-node interconnections between the various layers. Nodes of the input layer 820 can activate a set of nodes in the first hidden layer 822a. For example, as shown, each of the input nodes of the input layer 820 is connected to each of the nodes of the first hidden layer 822a. The nodes of the first hidden layer 822a can transform the information of each input node by applying activation functions to the input node information. The information derived from the transformation can then be passed to and can activate the nodes of the next hidden layer 822b, which can perform their own designated functions. Example functions include convolutional, up-sampling, data transformation, and/or any other suitable functions. The output of the hidden layer 822b can then activate nodes of the next hidden layer, and so on. The output of the last hidden layer 822n can activate one or more nodes of the output layer 821, at which an output is provided. In some cases, while nodes (e.g., node 826) in the neural network 800 are shown as having multiple output lines, a node has a single output and all lines shown as being output from a node represent the same output value.

In some cases, each node or interconnection between nodes can have a weight that is a set of parameters derived from the training of the neural network 800. Once the neural network 800 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 800 to be adaptive to inputs and able to learn as more and more data is processed.

The neural network 800 is pre-trained to process the features from the data in the input layer 820 using the different hidden layers 822a, 822b, through 822n in order to provide the output through the output layer 821. In an example in which the neural network 800 is used to identify activities being performed by a driver in frames, the neural network 800 can be trained using training data that includes both frames and labels, as described above. For instance, training frames can be input into the network, with each training frame having a label indicating the features in the frames (for the feature extraction machine learning system) or a label indicating classes of an activity in each frame. In one example using object classification for illustrative purposes, a training frame can include an image of a number 2, in which case the label for the image can be [0 0 1 0 0 0 0 0 0 0].

In some cases, the neural network 800 can adjust the weights of the nodes using a training process called backpropagation. As noted above, a backpropagation process can include a forward pass, a loss function, a backward pass, and a weight update. The forward pass, loss function, backward pass, and parameter update is performed for one training iteration. The process can be repeated for a certain number of iterations for each set of training images until the neural network 800 is trained well enough so that the weights of the layers are accurately tuned.

For the example of identifying objects in frames, the forward pass can include passing a training frame through the neural network 800. The weights are initially randomized before the neural network 800 is trained. As an illustrative example, a frame can include an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (e.g., red, green, and blue, or luma and two chroma components, or the like).

As noted above, for a first training iteration for the neural network 800, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 800 is unable to determine low level features and thus cannot make an accurate determination of what the classification of the object might be. A loss function can be used to analyze error in the output. Any suitable loss function definition can be used, such as a Cross-Entropy loss. Another example of a loss function includes the mean squared error (MSE), defined as $E_{total}=\Sigma\frac{1}{2}(target-output)^2$. The loss can be set to be equal to the value of $E_{total}$.

The loss (or error) will be high for the first training images since the actual values will be much different than the predicted output. The goal of training is to minimize the amount of loss so that the predicted output is the same as the training label. The neural network 800 can perform a backward pass by determining which inputs (weights) most contributed to the loss of the network, and can adjust the weights so that the loss decreases and is eventually minimized. A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta \frac{dL}{dW},$$

where w denotes a weight, $w_i$ denotes the initial weight, and η denotes a learning rate. The learning rate can be set to any suitable value, with a high learning rate including larger weight updates and a lower value indicating smaller weight updates.

The neural network 800 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. The neural network 800 can include any other deep network other than a CNN, such as an autoencoder, a deep belief nets (DBNs), a Recurrent Neural Networks (RNNs), among others.

Figure 9:
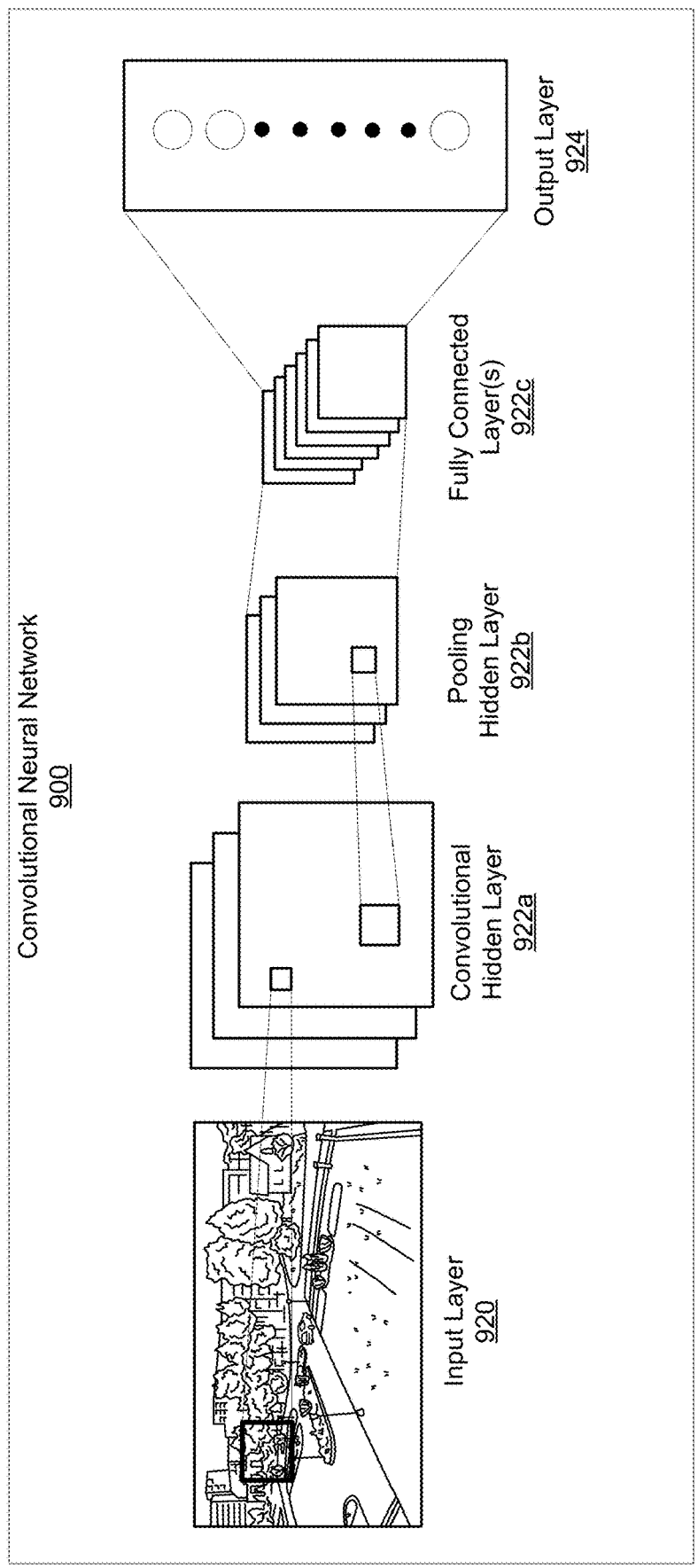
FIG. 9 is a block diagram illustrating an example of a convolutional neural network (CNN), in accordance with some examples.

FIG. 9 is an illustrative example of a convolutional neural network (CNN) 900. The input layer 920 of the CNN 900 includes data representing an image or frame. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 922a, an optional non-linear activation layer, a pooling hidden layer 922b, and fully connected hidden layers 922c to get an output at the output layer 924. While only one of each hidden layer is shown in FIG. 9, one of ordinary skill will appreciate that multiple convolutional hidden layers, non-linear layers, pooling hidden layers, and/or fully connected layers can be included in the CNN 900. As previously described, the output can indicate a single class of an object or can include a probability of classes that best describe the object in the image.

The first layer of the CNN 900 is the convolutional hidden layer 922a. The convolutional hidden layer 922a analyzes the image data of the input layer 920. Each node of the convolutional hidden layer 922a is connected to a region of nodes (pixels) of the input image called a receptive field. The convolutional hidden layer 922a can be considered as one or more filters (each filter corresponding to a different activation or feature map), with each convolutional iteration of a filter being a node or neuron of the convolutional hidden layer 922a. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 922a. Each connection between a node and a receptive field for that node learns a weight and, in some cases, an overall bias such that each node learns to analyze its particular local receptive field in the input image. Each node of the hidden layer 922a will have the same weights and bias (called a shared weight and a shared bias). For example, the filter has an array of weights (numbers) and the same depth as the input. A filter will have a depth of 3 for the video frame example (according to three color components of the input image). An illustrative example size of the filter array is 5×5×3, corresponding to a size of the receptive field of a node.

The convolutional nature of the convolutional hidden layer 922a is due to each node of the convolutional layer being applied to its corresponding receptive field. For example, a filter of the convolutional hidden layer 922a can begin in the top-left corner of the input image array and can convolve around the input image. As noted above, each convolutional iteration of the filter can be considered a node or neuron of the convolutional hidden layer 922a. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 922a. For example, a filter can be moved by a step amount (referred to as a stride) to the next receptive field. The stride can be set to 1 or other suitable amount. For example, if the stride is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 922a.

The mapping from the input layer to the convolutional hidden layer 922a is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a stride of 1) of a 28×28 input image. The convolutional hidden layer 922a can include several activation maps in order to identify multiple features in an image. The example shown in FIG. 9 includes three activation maps. Using three activation maps, the convolutional hidden layer 922a can detect three different kinds of features, with each feature being detectable across the entire image.

In some examples, a non-linear hidden layer can be applied after the convolutional hidden layer 922a. The non-linear layer can be used to introduce non-linearity to a system that has been computing linear operations. One illustrative example of a non-linear layer is a rectified linear unit (ReLU) layer. A ReLU layer can apply the function $f(x)=\max(0, x)$ to all of the values in the input volume, which changes all the negative activations to 0. The ReLU can thus increase the non-linear properties of the CNN 900 without affecting the receptive fields of the convolutional hidden layer 922a.

The pooling hidden layer 922b can be applied after the convolutional hidden layer 922a (and after the non-linear hidden layer when used). The pooling hidden layer 922b is used to simplify the information in the output from the convolutional hidden layer 922a. For example, the pooling hidden layer 922b can take each activation map output from the convolutional hidden layer 922a and generates a condensed activation map (or feature map) using a pooling function. Max-pooling is one example of a function performed by a pooling hidden layer. Other forms of pooling functions be used by the pooling hidden layer 922a, such as average pooling, L2-norm pooling, or other suitable pooling functions. A pooling function (e.g., a max-pooling filter, an L2-norm filter, or other suitable pooling filter) is applied to each activation map included in the convolutional hidden layer 922a. In the example shown in FIG. 9, three pooling filters are used for the three activation maps in the convolutional hidden layer 922a.

In some examples, max-pooling can be used by applying a max-pooling filter (e.g., having a size of 2×2) with a stride (e.g., equal to a dimension of the filter, such as a stride of 2) to an activation map output from the convolutional hidden layer 922a. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 922a having a dimension of 24×24 nodes, the output from the pooling hidden layer 922b will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 900.

The final layer of connections in the network is a fully-connected layer that connects every node from the pooling hidden layer 922b to every one of the output nodes in the output layer 924. Using the example above, the input layer includes 28×28 nodes encoding the pixel intensities of the input image, the convolutional hidden layer 922a includes 3×24×24 hidden feature nodes based on application of a 5×5 local receptive field (for the filters) to three activation maps, and the pooling hidden layer 922b includes a layer of 3×12×12 hidden feature nodes based on application of max-pooling filter to 2×2 regions across each of the three feature maps. Extending this example, the output layer 924 can include ten output nodes. In such an example, every node of the 3×12×12 pooling hidden layer 922b is connected to every node of the output layer 924.

The fully connected layer 922c can obtain the output of the previous pooling hidden layer 922b (which should represent the activation maps of high-level features) and determines the features that most correlate to a particular class. For example, the fully connected layer 922c layer can determine the high-level features that most strongly correlate to a particular class, and can include weights (nodes) for the high-level features. A product can be computed between the weights of the fully connected layer 922c and the pooling hidden layer 922*b* to obtain probabilities for the different classes. For example, if the CNN 900 is being used to predict that an object in a video frame is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 924 can include an M-dimensional vector (in the prior example, M=10). M indicates the number of classes that the CNN 900 has to choose from when classifying the object in the image. Other example outputs can also be provided. Each number in the M-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

FIG. 10 illustrates an example computing device with a computing device architecture 1000 incorporating parts of a computing device that can be used to performing one or more of the techniques described herein. A computing device as illustrated in FIG. 10 may be incorporated as part of any computerized system, herein. For example, computing device architecture 1000 may represent some of the components of a mobile device, or a computing device executing a 3D model retrieval system or tool. Examples of a computing device architecture 1000 include, but are not limited to, desktops, workstations, personal computers, supercomputers, video game consoles, tablets, smart phones, laptops, netbooks, or other portable devices. FIG. 10 provides a schematic illustration of one embodiment of a computing device having the architecture 1000 that may perform the methods provided by various other embodiments, as described herein, and/or may function as the host computing device, a remote kiosk/terminal, a point-of-sale device, a mobile multifunction device, a set-top box and/or a computing device. FIG. 10 is meant only to provide a generalized illustration of various components, any or all of which may be utilized as appropriate. FIG. 10, therefore, broadly illustrates how individual system elements may be implemented in a relatively separated or relatively more integrated manner.

The computing device architecture 1000 is shown comprising hardware elements that may be electrically coupled via a bus 1005 (or may otherwise be in communication, as appropriate). The hardware elements may include one or more processors 1010, including without limitation one or more general-purpose processors and/or one or more special-purpose processors (such as digital signal processing chips, graphics acceleration processors, and/or the like); one or more input devices 1015, which may include without limitation a camera, sensors 1050, a mouse, a keyboard and/or the like; and one or more output devices 1020, which may include without limitation a display unit, a printer and/or the like.

The computing device architecture 1000 may further include (and/or be in communication with) one or more non-transitory storage devices 1025, which may comprise, without limitation, local and/or network accessible storage, and/or may include, without limitation, a disk drive, a drive array, an optical storage device, a solid-form storage device such as a random access memory ("RAM") and/or a read-only memory ("ROM"), which may be programmable, flash-updateable and/or the like. Such storage devices may be configured to implement any appropriate data storage, including without limitation, various file systems, database structures, and/or the like.

The computing device architecture 1000 might also include a communications subsystem 1030. The communications subsystem 1030 may include a transceiver for receiving and transmitting data or a wired and/or wireless medium. The communications subsystem 1030 may also include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 1030 may permit data to be exchanged with a network (such as the network described below, to name one example), other computing devices, and/or any other devices described herein. In many embodiments, the computing device architecture 1000 will further comprise a non-transitory working memory 1035, which may include a RAM or ROM device, as described above.

The computing device architecture 1000 may comprise software elements, shown as being currently located within the working memory 1035, including an operating system 1040, device drivers, executable libraries, and/or other code, such as one or more application programs 1045, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a computer-readable storage medium, such as the storage device(s) 1025 described above. In some cases, the storage medium might be incorporated within a computing device, such as a computing device having the computing device architecture 1000. In other embodiments, the storage medium might be separate from a computing device (e.g., a removable medium, such as a compact disc), and/or provided in an installation package, such that the storage medium may be used to program, configure and/or adapt a general purpose computer with the instructions/code stored thereon. These instructions might take the form of executable code, which is executable by the computing device architecture 1000 and/or might take the form of source and/or installable code, which, upon compilation and/or installation on the computing device architecture 1000 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Some embodiments may employ a computing device (such as a computing device having the computing device architecture 1000) to perform methods in accordance with the disclosure. For example, some or all of the procedures of the described methods may be performed by a computing device having the computing device architecture 1000 in response to processor 1010 executing one or more sequences of one or more instructions (which might be incorporated into the operating system 1040 and/or other code, such as an application program 1045) contained in the working memory 1035. Such instructions may be read into the working memory 1035 from another computer-readable medium, such as one or more of the storage device(s) 1025. Merely by way of example, execution of the sequences of instructions contained in the working memory 1035 might cause the processor(s) 1010 to perform one or more procedures of the methods described herein.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "one or more of A or B" means A, B, or A and B. In another example, claim language reciting "one or more of A, B, or C" means A, B, C, or A and B, or A and C, or B and C, or A and B and C. The language "at least one of" a set and/or "one or more" of a set does not limit the set to the items listed in the set. For example, claim language reciting "one or more of A or B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1: A method of determining one or more poses of one or more objects, the method comprising: determining, using a machine learning system, a plurality of keypoints from an image, the plurality of keypoints being associated with at least one object in the image; determining a plurality of features from the machine learning system based on the plurality of keypoints; classifying the plurality of features into a plurality of joint types; and determining pose parameters for the at least one object based on the plurality of joint types.

Aspect 2: The method of aspect 1, wherein the at least one object includes at least one hand.

Aspect 3: The method of any one of aspects 1 or 2, wherein the at least one object includes two objects, wherein the plurality of keypoints includes keypoints for the two objects, and wherein the pose parameters include pose parameters for the two objects.

Aspect 4: The method of any one of aspects 1 or 2, wherein the at least one object includes two hands, wherein the plurality of keypoints includes keypoints for the two hands, and wherein the pose parameters include pose parameters for the two hands.

Aspect 5: The method of any one of aspects 1 or 2, wherein the at least one object includes a single hand, and further comprising: determining, using the machine learning system, a plurality of object keypoints from the image, the plurality of object keypoints being associated with an object associated with the single hand; and determining pose parameters for the object based on the plurality of object keypoints.

Aspect 6: The method of any one of aspects 1 to 5, wherein each keypoint of the plurality of keypoints corresponds to a joint of the at least one object.

Aspect 7: The method of any one of aspects 1 to 6, wherein determining the plurality of features from the machine learning system based on the plurality of keypoints includes: determining, from a first feature map of the machine learning system, a first set of features that correspond to the plurality of keypoints, the first feature map including a first resolution; and determining, from a second feature map of the machine learning system, a second set of features that correspond to the plurality of keypoints, the second feature map including a second resolution.

Aspect 8: The method of any one of aspects 1 to 7, further comprising: generating a feature representation for each keypoint of the plurality of keypoints, wherein the plurality of features are classified into the plurality of joint types using the feature representation for each keypoint.

Aspect 9: The method of aspect 8, wherein the feature representation for each keypoint includes an encoding vector.

Aspect 10: The method of any one of aspects 1 to 9, wherein the machine learning system includes a neural network, the neural network using the image as input.

Aspect 11: The method of any one of aspects 1 to 10, wherein the plurality of features are classified into the plurality of joint types by an encoder of a transformer neural network, and wherein the pose parameters determined for the at least one object are determined based on the plurality of joint types by a decoder of the transformer neural network.

Aspect 12: The method of any one of aspects 1 to 11, wherein the pose parameters are determined for the at least one object based on the plurality of joint types and based on one or more learned joint queries.

Aspect 13: The method of aspect 12, wherein the at least one object includes a first object and a second object, and wherein the one or more learned joint queries are used to predict at least one of a relative translation between the first object and the second object, a set of object shape parameters, and camera model parameters.

Aspect 14: The method of any one of aspects 1 to 13, wherein the pose parameters for the at least one object include a three-dimensional vector for each joint of the plurality of joint types.

Aspect 15: The method of aspect 14, wherein the three-dimensional vector for each joint of the plurality of joint types includes a horizontal component, a vertical component, and a depth component.

Aspect 16: The method of aspect 14, wherein the three-dimensional vector for each joint of the plurality of joint types includes a vector between each joint and a parent joint associated with each joint.

Aspect 17: The method of any one of aspects 1 to 13, wherein the pose parameters for the at least one object include a location of each joint and a difference between a depth of each joint and a depth of a parent joint associated with each joint.

Aspect 18: The method of any one of aspects 1 to 17, wherein the pose parameters for the at least one object include a translation of the at least one object relative to another object in the image.

Aspect 19: The method of any one of aspects 1 to 18, wherein the pose parameters for the at least one object include a shape of the at least one object.

Aspect 20: The method of any one of aspects 1 to 19, further comprising determining a user input based on the pose parameters.

Aspect 21: The method of any one of aspects 1 to 20, further comprising rendering virtual content based on the pose parameters.

Aspect 22: The method of any one of aspects 1 to 21, wherein the apparatus is an extended reality device (e.g., ahead-mounted display, extended reality glasses, or other extended reality device).

Aspect 23: An apparatus for determining one or more poses of one or more objects, comprising: at least one memory; and at least one processor coupled to the at least one memory, the at least one processor configured to: determine, using a machine learning system, a plurality of keypoints from an image, the plurality of keypoints being associated with at least one object in the image; determine a plurality of features from the machine learning system based on the plurality of keypoints; classify the plurality of features into a plurality of joint types; and determine pose parameters for the at least one object based on the plurality of joint types.

Aspect 24: The apparatus of aspect 23, wherein the at least one object includes at least one hand.

Aspect 25: The apparatus of any one of aspects 23 or 24, wherein the at least one object includes two objects, wherein the plurality of keypoints includes keypoints for the two objects, and wherein the pose parameters include pose parameters for the two objects.

Aspect 26: The apparatus of any one of aspects 23 or 24, wherein the at least one object includes two hands, wherein the plurality of keypoints includes keypoints for the two hands, and wherein the pose parameters include pose parameters for the two hands.

Aspect 27: The apparatus of any one of aspects 23 or 24, wherein the at least one object includes a single hand, and wherein the at least one processor is configured to: determine, using the machine learning system, a plurality of object keypoints from the image, the plurality of object keypoints being associated with an object associated with the single hand; and determine pose parameters for the object based on the plurality of object keypoints.

Aspect 28: The apparatus of any one of aspects 23 to 27, wherein each keypoint of the plurality of keypoints corresponds to a joint of the at least one object.

Aspect 29: The apparatus of any one of aspects 23 to 28, wherein, to determine the plurality of features from the machine learning system based on the plurality of keypoints, the at least one processor is configured to: determine, from a first feature map of the machine learning system, a first set of features that correspond to the plurality of keypoints, the first feature map including a first resolution; and determine, from a second feature map of the machine learning system, a second set of features that correspond to the plurality of keypoints, the second feature map including a second resolution.

Aspect 30: The apparatus of any one of aspects 23 to 29, wherein the at least one processor is configured to: generate a feature representation for each keypoint of the plurality of keypoints, wherein the plurality of features are classified into the plurality of joint types using the feature representation for each keypoint.

Aspect 31: The apparatus of aspect 23, wherein the feature representation for each keypoint includes an encoding vector.

Aspect 32: The apparatus of any one of aspects 23 to 31, wherein the machine learning system includes a neural network, the neural network using the image as input.

Aspect 33: The apparatus of any one of aspects 23 to 32, wherein the plurality of features are classified into the plurality of joint types by an encoder of a transformer neural network, and wherein the pose parameters determined for the at least one object are determined based on the plurality of joint types by a decoder of the transformer neural network.

Aspect 34: The apparatus of any one of aspects 23 to 33, wherein the pose parameters are determined for the at least one object based on the plurality of joint types and based on one or more learned joint queries.

Aspect 35: The apparatus of aspect 34, wherein the at least one object includes a first object and a second object, and wherein the one or more learned joint queries are used to predict at least one of a relative translation between the first object and the second object, a set of object shape parameters, and camera model parameters.

Aspect 36: The apparatus of any one of aspects 23 to 35, wherein the pose parameters for the at least one object include a three-dimensional vector for each joint of the plurality of joint types.

Aspect 37: The apparatus of aspect 36, wherein the three-dimensional vector for each joint of the plurality of joint types includes a horizontal component, a vertical component, and a depth component.

Aspect 38: The apparatus of aspect 36, wherein the three-dimensional vector for each joint of the plurality of joint types includes a vector between each joint and a parent joint associated with each joint.

Aspect 39: The apparatus of any one of aspects 23 to 35, wherein the pose parameters for the at least one object include a location of each joint and a difference between a depth of each joint and a depth of a parent joint associated with each joint.

Aspect 40: The apparatus of any one of aspects 23 to 39, wherein the pose parameters for the at least one object include a translation of the at least one object relative to another object in the image.

Aspect 41: The apparatus of any one of aspects 23 to 40, wherein the pose parameters for the at least one object include a shape of the at least one object.

Aspect 42: The apparatus of any one of aspects 23 to 41, wherein the at least one processor is configured to determine a user input based on the pose parameters.

Aspect 43: The apparatus of any one of aspects 23 to 42, wherein the at least one processor is configured to render virtual content based on the pose parameters.

Aspect 44: The apparatus of any one of aspects 23 to 43, wherein the apparatus comprises a mobile device.

Aspect 45: The apparatus of any one of aspects 23 to 44, wherein the apparatus comprises an extended reality device (e.g., a head-mounted display, extended reality glasses, or other extended reality device).

Aspect 46: The apparatus of any one of aspects 23 to 45, wherein the at least one processor comprises a neural processing unit (NPU).

Aspect 47: The apparatus of any one of aspects 23 to 46, further comprising a display configured to display one or more images.

Aspect 48: The apparatus of any one of aspects 23 to 47, further comprising an image sensor configured to capture one or more images.

Aspect 49: A non-transitory computer-readable medium including instructions that, when executed by one or more processors, cause the one or more processors to perform operations according to any of aspects 1 to 48.

Aspect 50: An apparatus for determining one or more poses of one or more objects, the apparatus comprising one or more means for performing operations according to any of aspects 1 to 48.

What is claimed is:

1. An apparatus for determining one or more poses of one or more objects, comprising:
   at least one memory; and
   at least one processor coupled to the at least one memory, the at least one processor configured to:
      determine, using a machine learning system, a plurality of keypoints from an image, the plurality of keypoints being associated with at least one object in the image;
      determine a plurality of features from the machine learning system based on the plurality of keypoints;
      classify the plurality of features into a plurality of joint types; and
      determine pose parameters for the at least one object based on the plurality of joint types, wherein the pose parameters are determined for the at least one object based on the plurality of joint types and based on one or more learned joint queries.

2. The apparatus of claim 1, wherein the at least one object includes at least one hand.

3. The apparatus of claim 1, wherein the at least one object includes two objects, wherein the plurality of keypoints includes keypoints for the two objects, and wherein the pose parameters include pose parameters for the two objects.

4. The apparatus of claim 1, wherein the at least one object includes two hands, wherein the plurality of keypoints includes keypoints for the two hands, and wherein the pose parameters include pose parameters for the two hands.

5. The apparatus of claim 1, wherein the at least one object includes a single hand, and wherein the at least one processor is configured to:
   determine, using the machine learning system, a plurality of object keypoints from the image, the plurality of object keypoints being associated with an object associated with the single hand; and
   determine pose parameters for the object based on the plurality of object keypoints.

6. The apparatus of claim 1, wherein each keypoint of the plurality of keypoints corresponds to a joint of the at least one object.

7. The apparatus of claim 1, wherein, to determine the plurality of features from the machine learning system based on the plurality of keypoints, the at least one processor is configured to:
   determine, from a first feature map of the machine learning system, a first set of features that correspond to the plurality of keypoints, the first feature map including a first resolution; and
   determine, from a second feature map of the machine learning system, a second set of features that correspond to the plurality of keypoints, the second feature map including a second resolution.

8. The apparatus of claim 1, wherein the at least one processor is configured to:
   generate a feature representation for each keypoint of the plurality of keypoints, wherein the plurality of features are classified into the plurality of joint types using the feature representation for each keypoint.

9. The apparatus of claim 8, wherein the feature representation for each keypoint includes an encoding vector.

10. The apparatus of claim 1, wherein the machine learning system includes a neural network, the neural network using the image as input.

11. The apparatus of claim 1, wherein the plurality of features are classified into the plurality of joint types by an encoder of a transformer neural network, and wherein the pose parameters determined for the at least one object are determined based on the plurality of joint types by a decoder of the transformer neural network.

12. The apparatus of claim 1, wherein the at least one object includes a first object and a second object, and wherein the one or more learned joint queries are used to predict at least one of a relative translation between the first object and the second object, a set of object shape parameters, and camera model parameters.

13. The apparatus of claim 1, wherein the pose parameters for the at least one object include a three-dimensional vector for each joint of the plurality of joint types.

14. The apparatus of claim 13, wherein the three-dimensional vector for each joint of the plurality of joint types includes a horizontal component, a vertical component, and a depth component.

15. The apparatus of claim 13, wherein the three-dimensional vector for each joint of the plurality of joint types includes a vector between each joint and a parent joint associated with each joint.

16. The apparatus of claim 1, wherein the pose parameters for the at least one object include a location of each joint and a difference between a depth of each joint and a depth of a parent joint associated with each joint.

17. The apparatus of claim 1, wherein the pose parameters for the at least one object include a translation of the at least one object relative to another object in the image.

18. The apparatus of claim 1, wherein the pose parameters for the at least one object include a shape of the at least one object.

19. The apparatus of claim 1, wherein the at least one processor is configured to determine a user input based on the pose parameters.

20. The apparatus of claim 1, wherein the at least one processor is configured to render virtual content based on the pose parameters.

21. The apparatus of claim 1, wherein the apparatus is an extended reality device.

22. A method of determining one or more poses of one or more objects, the method comprising:
    determining, using a machine learning system, a plurality of keypoints from an image, the plurality of keypoints being associated with at least one object in the image;
    determining a plurality of features from the machine learning system based on the plurality of keypoints;
    classifying the plurality of features into a plurality of joint types; and
    determining pose parameters for the at least one object based on the plurality of joint types, wherein the pose parameters are determined for the at least one object based on the plurality of joint types and based on one or more learned joint queries.

23. The method of claim 22, wherein the at least one object includes at least one hand.

24. The method of claim 22, wherein the at least one object includes two hands, wherein the plurality of keypoints includes keypoints for the two hands, and wherein the pose parameters include pose parameters for the two hands.

25. The method of claim 22, wherein the at least one object includes a single hand, and further comprising:
    determining, using the machine learning system, a plurality of object keypoints from the image, the plurality of object keypoints being associated with an object associated with the single hand; and
    determining pose parameters for the object based on the plurality of object keypoints.

26. The method of claim 22, wherein determining the plurality of features from the machine learning system based on the plurality of keypoints includes:
    determining, from a first feature map of the machine learning system, a first set of features that correspond to the plurality of keypoints, the first feature map including a first resolution; and
    determining, from a second feature map of the machine learning system, a second set of features that correspond to the plurality of keypoints, the second feature map including a second resolution.

27. The method of claim 22, further comprising:
    generating a feature representation for each keypoint of the plurality of keypoints, wherein the plurality of features are classified into the plurality of joint types using the feature representation for each keypoint.

28. The method of claim 22, wherein the plurality of features are classified into the plurality of joint types by an encoder of a transformer neural network, and wherein the pose parameters determined for the at least one object are determined based on the plurality of joint types by a decoder of the transformer neural network.

* * * * *